United States Patent
Wei et al.

(10) Patent No.: US 11,659,597 B2
(45) Date of Patent: May 23, 2023

(54) USER EQUIPMENT AND METHOD FOR TWO-STEP RANDOM ACCESS PROCEDURE

(71) Applicant: FG Innovation Company Limited, Tuen Mun (HK)

(72) Inventors: Chia-Hung Wei, Taipei (TW); Hai-Han Wang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 132 days.

(21) Appl. No.: 17/107,231

(22) Filed: Nov. 30, 2020

(65) Prior Publication Data

US 2021/0168874 A1    Jun. 3, 2021

Related U.S. Application Data

(60) Provisional application No. 62/941,975, filed on Nov. 29, 2019.

(51) Int. Cl.
*H04W 74/08*    (2009.01)
*H04W 72/23*    (2023.01)

(52) U.S. Cl.
CPC ....... *H04W 74/0833* (2013.01); *H04W 72/23* (2023.01)

(58) Field of Classification Search
CPC ........... H04W 74/0833; H04W 72/042; H04W 74/0808; H04W 52/36; H04W 76/19; H04W 52/02
See application file for complete search history.

(56) References Cited

U.S. PATENT DOCUMENTS

| | | | | |
|---|---|---|---|---|
| 2020/0221306 A1* | 7/2020 | Chen | ...................... | H04L 5/001 |
| 2020/0351822 A1* | 11/2020 | Roy | ...................... | H04W 68/02 |
| 2021/0100031 A1* | 4/2021 | Cirik | ...................... | H04W 76/19 |
| 2021/0168862 A1* | 6/2021 | Murray | ............. | H04W 74/0816 |
| 2021/0219348 A1* | 7/2021 | Zhang | ...................... | H04L 1/08 |

(Continued)

OTHER PUBLICATIONS

3GPP TS 38.331, "3rd Generation Partnership Project; Technical Specificabon Group Radio Access Network; NR; Radio Resource Control (RRC) protocol specification (Release 15)", V15.6.0 (Jun. 2019).

(Continued)

*Primary Examiner* — Chi Ho A Lee
(74) *Attorney, Agent, or Firm* — ScienBiziP, P.C.

(57) ABSTRACT

A user equipment and a method for a 2-step random access (RA) procedure are provided. The method includes performing a first Listen-Before-Talk (LBT) procedure on a Physical Random Access Channel (PRACH) occasion for transmitting a preamble of a message A (MSGA), performing a second LBT procedure on a Physical Uplink Shared Channel (PUSCH) occasion for transmitting a payload of the MSGA, the payload including a Cell-Radio Network Temporary Identifier (C-RNTI) Medium Access Control (MAC) Control Element (CE), monitoring Physical Downlink Control Channel (PDCCH) candidates for a first random access response (RAR) identified by a message B (MSGB)-Radio Network Temporary Identifier (RNTI) in a MSGB window, and determining whether to monitor the PDCCH candidates for a second RAR identified by the C-RNTI in the MSGB window based on whether the second LBT procedure is successful.

12 Claims, 10 Drawing Sheets

(56) References Cited

U.S. PATENT DOCUMENTS

| | | | |
|---|---|---|---|
| 2021/0250980 A1* | 8/2021 | Xue | H04W 52/02 |
| 2022/0183059 A1* | 6/2022 | Lee | H04W 74/0833 |
| 2022/0190906 A1* | 6/2022 | Haghighat | H04W 74/0841 |
| 2022/0217789 A1* | 7/2022 | Lee | H04W 52/36 |
| 2022/0232623 A1* | 7/2022 | Lee | H04W 74/0866 |
| 2022/0232638 A1* | 7/2022 | Zhang | H04W 74/0833 |

OTHER PUBLICATIONS

3GPP TS 38.321, "3rd Generation Partnership Project; Technical Specification Group Radio Access Network; NR; Medium Access Control (MAC) protocol specificabon (Release 15)", V15.12.0 (Mar. 2021).

3GPP TS 38.213, "3rd Generation Partnership Project; Technical Specification Group Radio Access Network; NR; Physical layer procedures for control (Release 15)", V15.6.0 (Jun. 2019).

* cited by examiner

USER EQUIPMENT AND METHOD FOR TWO-STEP RANDOM ACCESS PROCEDURE

CROSS-REFERENCE TO RELATED APPLICATION(S)

The present disclosure claims the benefit of and priority of provisional U.S. Patent Application Ser. No. 62/941,975, filed on Nov. 29, 2019, entitled "MSGB reception within Two-step Random Access Procedure" ("the '975 provisional"). The disclosure of the '975 provisional is hereby incorporated fully by reference into the present disclosure for all purposes.

FIELD

The present disclosure is related to wireless communication, and specifically, to a 2-step random access procedure in cellular wireless communication networks.

BACKGROUND

Abbreviations used in this disclosure include:

| Abbreviation | Full name |
| --- | --- |
| 3GPP | 3$^{rd}$ Generation Partnership Project |
| 5G | 5$^{th}$ Generation |
| ACK | Acknowledgment |
| AS | Access Stratum |
| BFD | Beam Failure Detection |
| BFR | Beam Failure Recovery |
| BS | Base Station |
| BWP | Bandwidth Part |
| C-RNTI | Cell Radio Network Temporary Identifier |
| CA | Carrier Aggregation |
| CCCH | Common Control Channel |
| CRC | Cyclic Redundancy Check |
| CS-RNTI | Configured Scheduling Radio Network Temporary Identifier |
| CSI | Channel State Information |
| CSI-RS | Channel State Information Reference Signal |
| CSS | Common Search Space |
| DC | Dual Connectivity |
| DCI | Downlink Control Information |
| DL | Downlink |
| DL-SCH | Downlink Shared Channel |
| DRB | (user) Data Radio Bearer |
| DRX | Discontinuous Reception |
| DTCH | Dedicated Traffic Channel |
| E-UTRA | Evolved Universal Terrestrial Radio Access |
| EN-DC | E-UTRA NR Dual Connectivity |
| ETSI | European Telecommunications Standards Institute |
| FR | Frequency Range |
| HARQ | Hybrid Automatic Repeat Request |
| HARQ-ACK | HARQ Acknowledgement |
| ID | Identifier |
| IE | Information Element |
| ITU | International Telecommunication Union |
| LBT | Listen Before Talk |
| LCH | Logical Channel |
| LCID | Logical Channel ID |
| LCP | Logical Channel Prioritization |
| LTE | Long Term Evolution |
| MAC | Medium Access Control |
| MAC CE | MAC Control Element |
| MCG | Master Cell Group |
| MCS-C-RNTI | Modulation Coding Scheme Cell Radio Network Temporary Identifier |
| MIMO | Multi-Input Multi-Output |
| MN | Master Node |
| MSGA | Message A |
| MSGB | Message B |
| MSGB-RNTI | Message B Radio Network Temporary Identifier |
| NACK | Negative Acknowledgment |
| NAS | Non-Access Stratum |
| NDI | New Data Indicator |
| NR | New Radio |
| NR-U | NR-Unlicensed |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical (layer) |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAR | Random Access Response |
| RF | Radio Frequency |
| RLC | Radio Link Control |
| RNTI | Radio Network Temporary Identifier |
| RRC | Radio Resource Control |
| RS | Reference Signal |
| RSRP | Reference Signal Received Power |
| SCell | Secondary Cell |
| SCG | Secondary Cell Group |
| SCS | Subcarrier Spacing |
| SDU | Service Data Unit |
| SN | Secondary Node |
| SRB | Signaling Radio Bearer |
| SS-RSRP | Synchronization Signal Reference Signal Received Power |
| SSB | Synchronization Signal Block |
| SUL | Supplementary Uplink |
| TB | Transport Block |
| TS | Technical Specification |
| UE | User Equipment |
| UL | Uplink |
| UL-SCH | Uplink Shared Channel |

Various efforts have been made to improve different aspects of wireless communication for cellular wireless communication systems, such as 5G NR by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to a 2-step RA procedure in cellular wireless communication networks.

According to an aspect of the present disclosure, a UE for a 2-step RA procedure is provided. The UE includes a processor and a memory coupled to the processor. The memory stores a computer-executable program that when executed by the processor, causes the processor to perform a first LBT procedure on a PRACH occasion for transmitting a preamble of a MSGA; perform a second LBT procedure on a PUSCH occasion for transmitting a payload of the MSGA, the payload including a C-RNTI MAC CE; monitor PDCCH candidates for a first RAR identified by a MSGB-RNTI in a MSGB window; and determine whether to monitor the PDCCH candidates for a second RAR identified by the C-RNTI in the MSGB window based on whether the second LBT procedure is successful.

According to another aspect of the present disclosure, a method performed by a UE for a 2-step RA procedure is provided. The method includes: performing a first LBT procedure on a PRACH occasion for transmitting a preamble of a MSGA; performing a second LBT procedure on a PUSCH occasion for transmitting a payload of the MSGA, the payload including a C-RNTI MAC CE; monitoring PDCCH candidates for a first RAR identified by a MSGB-RNTI in a MSGB window; and determining whether to monitor the PDCCH candidates for a second RAR identified by the C-RNTI in the MSGB window based on whether the second LBT procedure is successful.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1A:
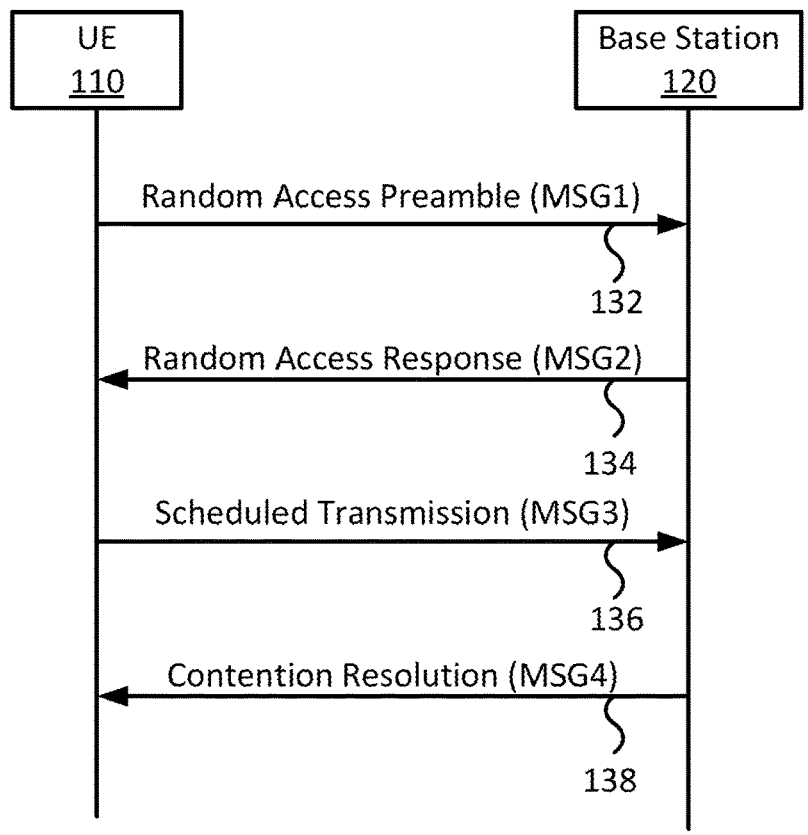
FIG. 1A illustrates a 4-step CBRA procedure according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

Cell: A radio network object that may be uniquely identified by a UE from a (cell) identification that is broadcast over a geographical area from one UTRAN Access Point. A Cell may be operated in a Frequency Division Duplex (FDD) or a Time Division Duplex (TDD) mode.

Serving Cell: For a UE in an RRC_CONNECTED state and not configured with CA/DC, there may be only one serving cell comprising of the primary cell (PCell). For a UE in the RRC_CONNECTED state and configured with CA/DC, the term "serving cells" may be used to indicate the set of cells comprising of the Special Cell(s) and all secondary cells.

Carrier Aggregation (CA): In CA, two or more Component Carriers (CCs) may be aggregated. A UE may simultaneously receive or transmit on one or multiple CCs depending on its capabilities. CA may be supported for both contiguous and non-contiguous CCs. When CA is applied, the frame timing and the system frame number (SFN) may be aligned across cells that are aggregated. The maximum number of configured CCs for a UE may be 16 for DL and 16 for UL. When CA is configured, the UE may only have one RRC connection with the network. During the RRC connection establishment/re-establishment/handover, one serving cell may provide the NAS mobility information, and during the RRC connection re-establishment/handover, one serving cell may provide the security input, where the serving cell may be referred to as the PCell. Depending on UE capabilities, SCells may be configured to form with the PCell as a set of serving cells. The configured set of serving cells for a UE therefore includes one PCell and one or more SCells.

Configured Grant (CG): A BS (e.g., a gNB) may allocate UL resources for the initial HARQ transmissions to UEs. There are two types of CGs:

.Type 1: the RRC entity may directly provide the configured UL grant (including the periodicity).
.Type 2: the RRC entity may define the periodicity of the configured UL grant while PDCCH addressed to the CS-RNTI may either signal and activate or deactivate the configured UL grant. The PDCCH addressed to the CS-RNTI may indicate that the configured UL grant may be implicitly reused according to the periodicity defined by the RRC entity until the configured UL grant is deactivated.

When a configured UL grant is active, a UL transmission according to the configured UL grant may be performed if the UE cannot find its C-RNTI/CS-RNTI/MCS-C-RNTI on the PDCCH(s). Otherwise, if the UE finds its C-RNTI/CS-RNTI/MCS-C-RNTI on the PDCCH(s), the PDCCH allocation may override the configured UL grant. The usage of the MCS-C-RNTI may be equivalent to that of the C-RNTI in MAC procedures (except for the C-RNTI MAC CE).

HARQ: A functionality that ensures delivery between peer entities at Layer 1 (e.g., PHY Layer). A single HARQ process may support one TB when the PHY layer is not configured for DL/UL spatial multiplexing. A single HARQ process may support one or multiple TBs when the PHY layer is configured for DL/UL spatial multiplexing. There may be one HARQ entity per serving cell. Each HARQ entity may support parallel processing of (e.g., multiple) DL and UL HARQ processes.

HARQ-ACK: HARQ-ACK may include a 1-bit indicator, where the HARQ-ACK may be a negative Acknowledgment (NACK) when the bit value of the indicator is set to a first value (e.g., "0") and may be a positive Acknowledgment (ACK) when the bit value of the indicator is set to a second value (e.g., "1").

Timer: a MAC entity may setup one or more timers for individual purposes, such as triggering UL signaling retransmission or limiting UL signaling retransmission periods. When a timer (e.g., the timers in various implementations of the present disclosure) maintained by the MAC entity is started, the timer may start running until it stops or expires. The timer may not run if it is not started. The timer may be started if it is not running. The timer may be restarted if it is running. The timer may be started or restarted from its initial value, which may be configured by a BS (e.g., a gNB) via DL RRC signaling, but not limited thereto.

BWP: A subset of the total cell bandwidth of a cell. Bandwidth Adaptation (BA) may be achieved by configuring the UE with BWP(s) and telling the UE which of the configured BWPs is currently the active one. To enable BA on the PCell, a BS (e.g., a gNB) may configure the UE with UL BWP(s) and DL BWP(s). To enable BA on SCells in case of CA, the BS may configure the UE with DL BWP(s) at least (which means there may be no UL BWP configured to the UE). For the PCell, the initial BWP may be the BWP used for initial access. For the SCell(s), the initial BWP may be the BWP configured to the UE to first operate during the SCell activation process. The UE may be configured with a first active uplink BWP via a firstActiveUplinkBWP IE field. If the first active uplink BWP is configured for an SpCell, the firstActiveUplinkBWP IE field may contain the ID of the UL BWP to be activated upon performing the RRC (re-)configuration. If the field is absent, the RRC (re-)configuration may not trigger a BWP switch. If the first active uplink BWP is configured for an SCell, the firstActiveUplinkBWP IE field may contain the ID of the UL BWP to be used upon MAC-activation of the SCell.

PDCCH: A BS (e.g., a gNB) may dynamically allocate DL resources to UEs via the C-RNTI/MCS-C-RNTI/CS-RNTI on PDCCH(s). The UE may monitor the PDCCH(s) to find possible assignments when its DL reception is enabled (e.g., activity governed by DRX when configured). When CA is configured, the same C-RNTI may apply to all serving cells.

PDSCH/PUSCH: A PDCCH may be used to schedule DL transmissions on a PDSCH and UL transmissions on a PUSCH.

Time Alignment Timer: An RRC entity may configure the initial value of a timer (e.g., a time alignment timer, corresponding to the IE "timeAlignmentTimer"). The timer may be used for the maintenance of UL time alignment. The time alignment timer may be maintained per timing advance group. The timer may control how long the MAC entity considers the serving cells belonging to the associated TAG to be UL time aligned.

SLIV: Start and Length Indicator Value for the time domain allocation for PUSCH/PDSCH. SLIV may define the start symbol and the number of consecutive symbols for PUSCH/PDSCH allocation.

TB: Data given from an upper layer (or MAC layer) to a PHY layer may be referred to as a TB.

LBT: A gNB and a UE may apply Listen-Before-Talk (LBT) before performing transmission on NR-U cells. When LBT is applied, the transmitter listens to/senses a channel to determine whether the channel is free or busy. The transmitter may perform transmission only if the channel is sensed free.

NR-U: NR radio access operating in unlicensed spectrum (referred to as NR-U) can operate in a PCell, an SCell, or a PSCell.

Primary Cell (PCell): The MCG cell, operating on the primary frequency, in which the UE either performs the initial connection establishment procedure or initiates the connection re-establishment procedure.

Primary SCG Cell (PSCell): For dual connectivity operation, the SCG cell in which the UE performs random access when performing the Reconfiguration with Sync procedure.

Serving Cell: For a UE in the RRC_CONNECTED state not configured with CA/DC there is only one serving cell comprising of the primary cell. For a UE in the RRC_CONNECTED state configured with CA/DC the term "serving cells" is used to denote the set of cells comprising of the Special Cell(s) and all secondary cells.

Secondary Cell (SCell): For a UE configured with CA, a cell providing additional radio resources on top of Special Cell.

Special Cell (SpCell): For Dual Connectivity operation the term Special Cell refers to the PCell of the MCG or the PSCell of the SCG, otherwise the term Special Cell refers to the PCell.

Master Cell Group (MCG): in MR-DC, a group of serving cells associated with the Master Node, comprising of the SpCell (e.g., PCell) and optionally one or more SCells.

Master node: in MR-DC, the radio access node that provides the control plane connection to the core network. It may be a Master eNB (in E-UTRANR-Dual Connectivity (EN-DC)), a Master ng-eNB (in Next Generation E-UTRA NR-Dual Connectivity (NGEN-DC)) or a Master gNB (in NR NR-Dual Connectivity (NR-DC) and NR E-UTRA-Dual Connectivity (NE-DC)).

Secondary Cell Group (SCG): in MR-DC, a group of serving cells associated with the Secondary Node, comprising of the SpCell (e.g., PSCell) and optionally one or more SCells.

Secondary node: in MR-DC, the radio access node, with no control plane connection to the core network, providing additional resources to the UE. It may be a gNB (in EN-DC), a Secondary ng-eNB (in NE-DC) or a Secondary gNB (in NR-DC and NGEN-DC).

The terms, definitions and abbreviations in the present disclosure may be imported from existing documentation (ETSI, ITU or elsewhere) or newly created by 3GPP experts whenever a need for precise vocabulary is identified.

Types of a Random Access (RA) Procedure

In addition to a 4-step RA procedure, a 2-step RA procedure is expected to be supported in next generation cellular wireless communication system (e.g., 3GPP NR wireless communication system) in near future. Therefore, there will be at least three types of RA procedure supported: a 4-step contention based random access (CBRA), a 2-step CBRA, and contention free random access (CFRA).

FIG. 1A illustrates a 4-step CBRA procedure 100A according to an example implementation of the present disclosure. In action 132, a UE 110 transmits a random access preamble, also referred to as a Message 1 (MSG1), over a Physical Random Access Channel (PRACH) to a base station (BS) 120. In action 134, the BS 120 transmits a Random Access Response (RAR), also referred to as a Message 2 (MSG2), indicating reception of the preamble and providing a time-alignment command. In action 136, the UE 110 transmits a Message 3 (MSG3) to the BS 120. A MSG 3 may be the first scheduled transmission of the 4-step CBRA procedure 100A. A MSG 3 may include a cell-radio network temporary identifier (C-RNTI) MAC CE or common control channel (CCCH) service data unit (SDU), submitted from an upper layer and associated with the UE Contention Resolution Identity. In action 138, the BS 120 transmits a Message 4 (MSG4) for contention resolution. The UE 110 and the BS 120 may exchange messages (e.g., MSG 3 and MSG4) with the aim of resolving potential collisions due to simultaneous transmissions of the same preamble from multiple devices within the cell over the same time/frequency resources.

Figure 1B:
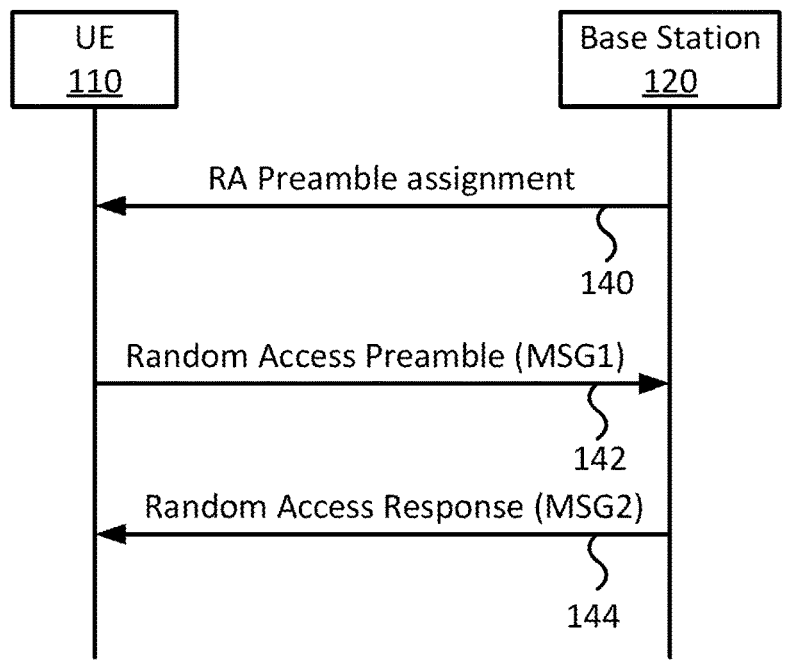
FIG. 1B illustrates a CFRA procedure according to an example implementation of the present disclosure.

FIG. 1B illustrates a CFRA procedure 100B according to an example implementation of the present disclosure. In action 140, the BS 120 assigns a RA preamble to the UE 110. In action 142, the UE 110 transmits a random access preamble, also referred to as a MSG1, to the BS 120. In action 144, the BS 120 transmits a random access response, also referred to as a MSG2, to the UE 110.

Figure 1C:
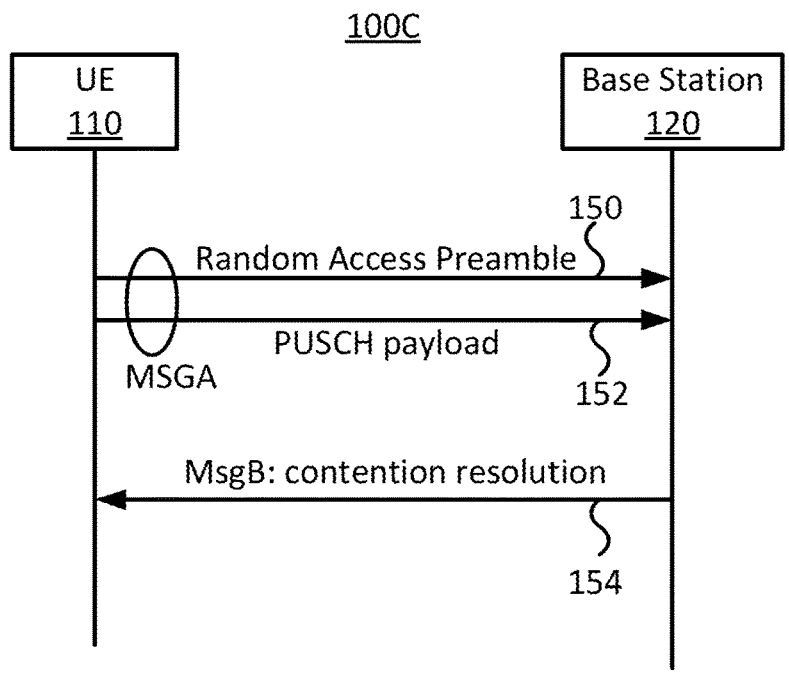
FIG. 1C illustrates a 2-step CBRA procedure according to an example implementation of the present disclosure.

FIG. 1C illustrates a 2-step CBRA procedure 100C according to an example implementation of the present disclosure. The 2-step CBRA procedure 100C may include transmission of a Message A (MSGA) and reception of a Message B (MSGB). The transmission of the MSGA may include transmission of a random access preamble transmission on a PRACH (action 150) and a payload transmission on a PUSCH (action 152). In one implementation, the payload of the MSGA may carry at least contents equivalent to a MSG 3 in a 4-step CBRA procedure illustrated in FIG. 1A. After successful detection of the PRACH preamble and decoding of the PUSCH payload in the MSGA, in action 154, the BS 120 transmits the MSGB to the UE 110 for contention resolution. The UE 110 monitors MSGB reception from the BS 120 within a configured window. If contention resolution is successful upon receiving the MSGB, the UE ends the 2-step CBRA procedure 100C.

Figure 1D:
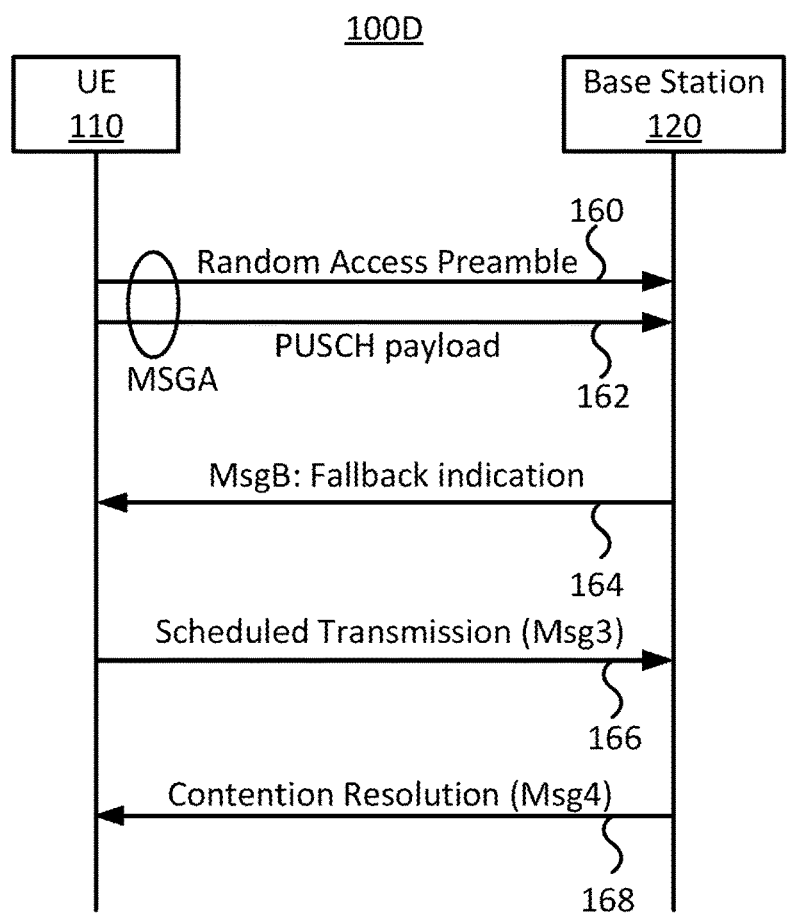
FIG. 1D illustrates a fallback procedure from a 2-step CBRA to a 4-step CBRA according to an example implementation of the present disclosure.

FIG. 1D illustrates a fallback procedure 100D from a 2-step CBRA to a 4-step CBRA according to an example implementation of the present disclosure. The UE 110 may first attempt the 2-step CBRA by transmitting a MSGA to the BS 120, including transmission of a random access preamble in action 160 and transmission of a PUSCH payload in action 162. In action 164, the UE 110 receives a fallback indication in a MSGB from the BS 120. The fallback indication instructs the UE 110 to fallback from the 2-step CBRA to the 4-step CBRA. In action 166, the UE 110 transmits a MSG 3 (substantially similar to the MSG 3 illustrated in FIG. 1A) to the BS 120. In action 168, the UE 110 monitors a MSG4 for contention resolution (substantially similar to the MSG4 illustrated in FIG. 1A). If contention resolution is not successful after transmission/retransmission(s) of the MSG3, the UE 110 may go back to MSGA transmission (action 160 and action 162). If the 2-step CBRA procedure is not successfully completed after a configured number of MSGA transmissions, the UE 110 may switch to the 4-step CBRA procedure.

For random access in a serving cell configured with SUL, the BS (also referred to as the network, NW) may explicitly signal which carrier to use (UL or SUL). If the NW does not indicate which carrier to use, the UE may select the SUL carrier if and only if the measured DL quality is lower than a broadcast threshold. In one implementation, the UE performs carrier selection before selecting between a 2-step and a 4-step random access. Once the random access procedure is started, all UL transmissions of the random access procedure remain on the selected carrier.

Although some of the fundamental messages that need to be exchanged between the UE and the BS on radio access network for the 2-step RA procedure have been defined, it is not clear with regard to what detailed information and parameter(s) need to be carried in these messages. It is also not clear with regard to how the BS and the UE react to the received information and parameter(s). In addition, from the wireless communication system's perspective, the format of these parameters and the triggering condition of the reaction behavior performed by the UE and the gNB need to be defined. Furthermore, the situation may become even more unclear when the radio access network is deployed in unlicensed spectrum bands. Implementations regarding the 2-step RA procedure, including overall behavior, MSGB reception, and behaviors in unlicensed spectrum bands, are provided in the present disclosure.

Modeling of Overall Behavior of RA Procedure

Figure 2A:
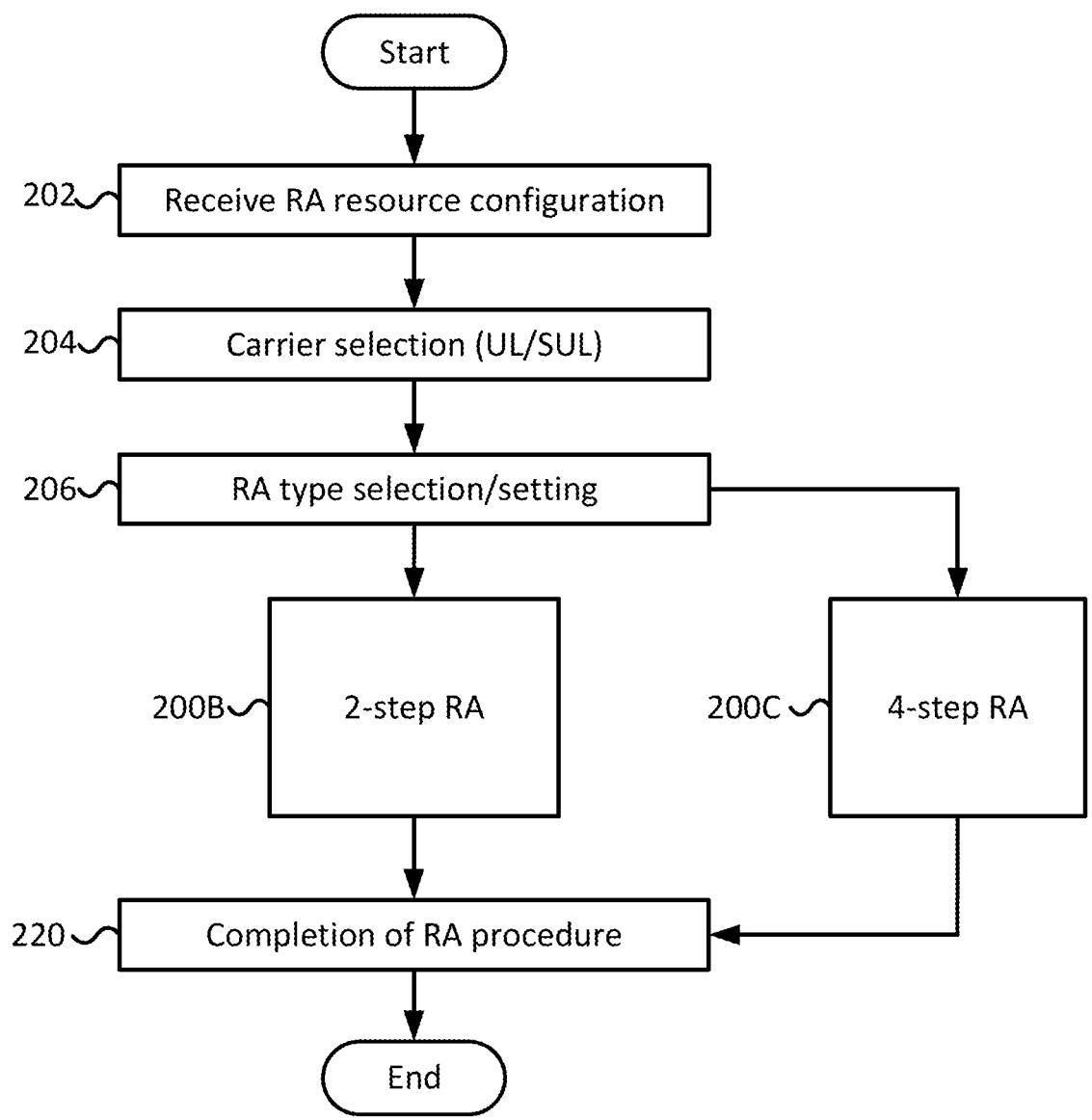
FIG. 2A illustrates a flowchart of an overall RA procedure according to an example implementation of the present disclosure.

FIG. 2A illustrates a flowchart of an overall RA procedure 200A according to an example implementation of the present disclosure. A UE may be configured with both 2-step and 4-step RA resources by a BS (e.g., gNB).

In action 202, the UE receives an RA related configuration(s) from the gNB via information elements (IEs) such as RACH-ConfigCommon, RACH-ConfigDedicated, RACH-ConfigGeneric, RA Prioritization and/or any other IEs that may be contained in broadcast RRC messages and/or unicast RRC messages. The RA related configuration may include, but is not limited to:

rsrp-ThresholdSSB-SUL: an RSRP threshold for the selection between the normal uplink (NUL) carrier and the SUL carrier.

rsrp-ThresholdSSB-2stepCBRA: an RSRP threshold for selection of 2-step random access.

msgATransMax: a maximum number of times a UE can transmit MSGA. The UE may fallback to 4-step RA after msgATransMax times of MSGA transmission.

msgB-Response Window: the time window to monitor MSGB (e.g., RA response(s)).

beamFailureRecoveryTimer_2StepRA: a timer for beam failure recovery. In one implementation, the UE does not use CFRA for BFR upon expiration of the timer. The value of the timer may be in units of milliseconds (ms). The UE may start the timer when the UE triggers an RA procedure for BFR and the UE selects the 2-step RA.

In action 204, the UE performs UL carrier selection. The UE measures the pathloss of DL reference signal preconfigured to be associated with UL and SUL. The UE selects the SUL carrier for performing the RA procedure if the RSRP of the DL pathloss reference is less than the rsrp-ThresholdSSB-SUL; otherwise, the UE selects the normal UL carrier.

In action 206, the UE performs RA type selection. The UE may select a 2-step RA and proceed to action 200B if the rsrp-ThresholdSSB-2stepCBRA is configured and the RSRP of DL pathloss reference is above the configured rsrp-ThresholdSSB-2stepCBRA. The UE may also select the 2-step RA and proceed to action 200B if the BWP selected for the RA procedure is only configured with 2-step RA resources. The UE may select a 4-step RA and proceed to action 200C if the UE does not select the 2-step RA.

Figure 2B:
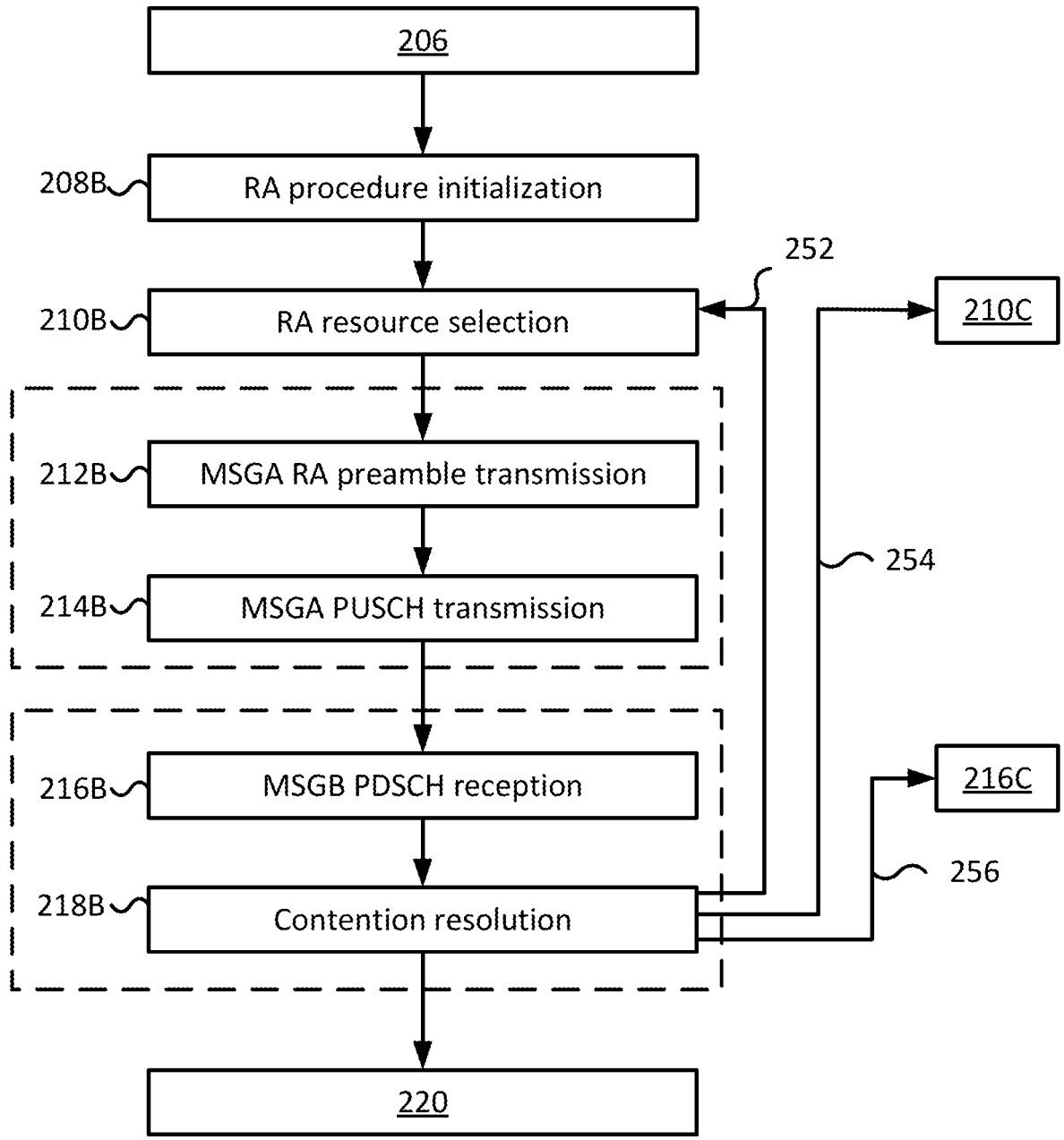
FIG. 2B illustrates a flowchart of a 2-step CBRA procedure according to an example implementation of the present disclosure.
Figure 2C:
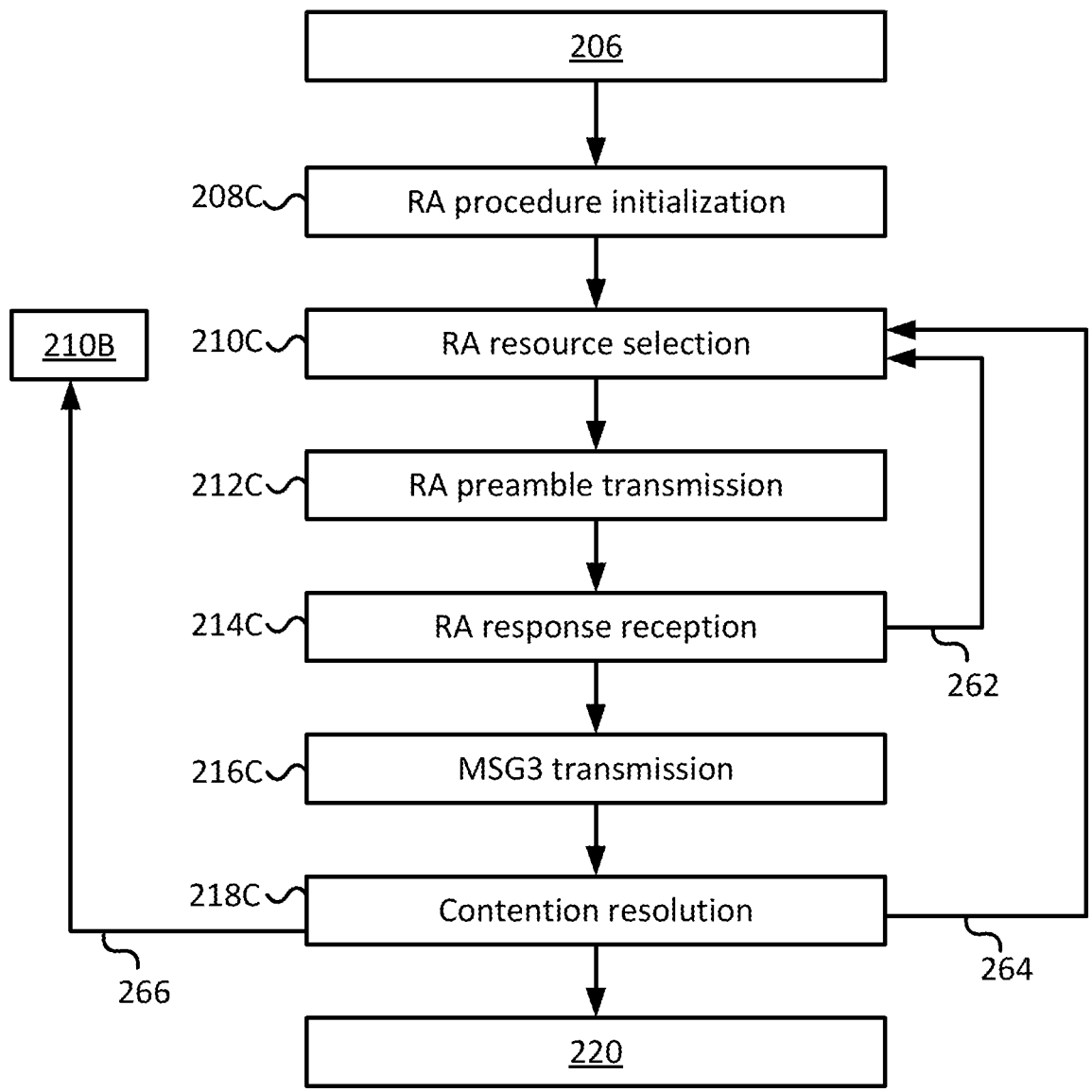
FIG. 2C illustrates a flowchart of a 4-step CBRA procedure according to an example implementation of the present disclosure.

FIG. 2B illustrates a flowchart of a 2-step CBRA procedure 200B according to an example implementation of the present disclosure. FIG. 2C illustrates a flowchart of a 4-step CBRA procedure 200C according to an example implementation of the present disclosure.

In action 208B, the UE performs RA procedure initialization. The RRC layer of the UE may configure the MAC layer of the UE with RA related parameters for the RA procedure according to the RA related configuration(s) received in action 202.

In action 210B, the UE performs RA resource selection. The UE may select RA resources associated with a SSB if the SSB with SS-RSRP above a rsrp-ThresholdSSB (as defined in 3GPP TS 38.331) among the associated SSBs is available. The RA resource selection may include a selection between CBRA resource and CFRA resource. In this example, the UE selects a CBRA resource and thus performs the 2-step CBRA. The 2-step CBRA may include MSGA transmission (action 212B and action 214B) and MSGB reception (action 216B and action 218B).

In action 212B, the UE performs MSGA RA preamble transmission. The UE may select an RA preamble randomly with equal probability from the 2-step RA preambles associated with the selected SSB. The UE may perform corresponding preamble transmission by using the selected PRACH occasion as the first part of MSGA transmission. The UE may compute a MSGB-RNTI associated with the PRACH occasion in which the RA preamble is transmitted.

In action 214B, the UE performs MSGA PUSCH transmission based on the MSGB-RNTI. Implementations of the MSGA PUSCH (e.g., payload of the MSGA) are illustrated in FIG. 3A and FIG. 3B.

Figure 3A:
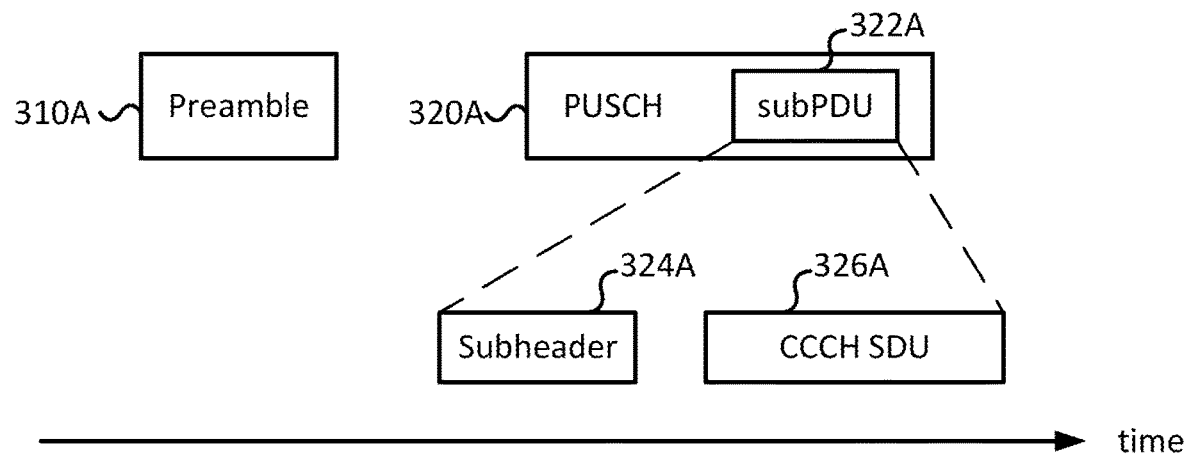
FIG. 3A illustrates a MSGA including a payload including a CCCH SDU according to an example implementation of the present disclosure.

FIG. 3A illustrates a MSGA 300A including a payload including a CCCH SDU according to an example implementation of the present disclosure. The MAC entity of the UE may indicate to the Multiplexing and assembly (M&A) entity to include a CCCH SDU 326A (e.g., a MAC SDU from CCCH) in the subsequent UL transmission if the PUSCH 320A transmission is being made for the CCCH logical channel. The PUSCH 320A may be associated with a preamble 310A and the PRACH occasion. The MSGA 300A includes the preamble 310A and PUSCH 320A (payload of the MSGA 300A) including a subPDU 322A. The subPDU 322A includes a subheader 324A and a CCCH SDU 326A.

Figure 3B:
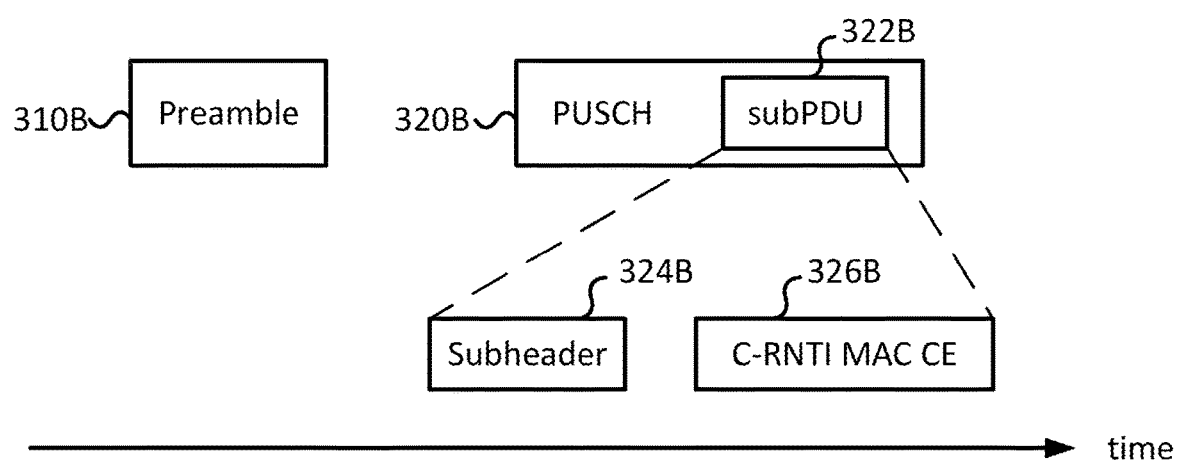
FIG. 3B illustrates a MSGA including a payload including a C-RNTI MAC CE according to an example implementation of the present disclosure.

FIG. 3B illustrates a MSGA 300B including a payload including a C-RNTI MAC CE according to an example implementation of the present disclosure. The MAC entity of the UE may indicate to the M&A entity to include a C-RNTI MAC CE 326B in the subsequent UL transmission (e.g., a PUSCH 320B associated with a preamble 310B) if the PUSCH 320B transmission is not being made for the CCCH logical channel (for example, the RA is triggered for beam failure recovery or the RA is triggered for RRC connection resume procedure). The PUSCH 320B may be associated with the preamble 310B and the PRACH occasion. The MSGA 300B includes preamble 310B and PUSCH 320B (payload of the MSGA 300B) including a subPDU 322B. The subPDU 322B includes a subheader 324B and a C-RNTI MAC CE 326B. In one implementation the UE is in an RRC_CONNECTED state. Because the C-RNTI is UE specific, by including C-RNTI MAC CE in the MSGA 300B, the BS can identify the UE performing the RA procedure based on the received MSGA 300B. The BS can then schedule data transmission with the identified UE using the C-RNTI.

Afterward, the MAC entity of the UE may instruct the PHY layer to transmit the PUSCH 320A/320B using the corresponding MSGB-RNTI as the second part of the MSGA transmission (action 212B being the first part of the MSGA transmission). That is, a TB for the PUSCH 320A/320B transmission may be with CRC bits scrambled by the MSGB-RNTI. The preamble 310A/310B is identified by an RA-RNTI, whereas the PUSCH 320A/320B is identified by the MSGB-RNTI.

It should be noted that depending on how the UE computes the MSGB-RNTI, different preambles selected by different UEs may result in a same value of the MSGB-RNTI (i.e., the computation outcome of MSGB-RNTI may be the same for multiple preambles). For example, two UEs, including UE #1 and UE #2, trigger an RA procedure respectively. Both UE #1 and UE #2 select 2-step RA. UE #1 and UE #2 select preamble #1 and preamble #2, respectively. UE #1 computes a MSGB-RNTI based on at least the transmitted preamble #1, and UE #2 computes a MSGB-RNTI based on at least the transmitted preamble #2. The MSGB-RNTI of UE #1 may be the same as the MSGB-RNTI of UE #2. Afterward, a gNB may reply a random access response to UE #1 and another random access response to UE #2 via a single MSGB transmission. That is, the gNB may multiplex a subPDU carrying RAR of UE #1 and a subPDU carrying RAR of UE #2 into a single MAC PDU. The MAC PDU is transmitted via a TB scheduled by a downlink assignment (e.g., scheduled by DCI) identified by the MSGB-RNTI (e.g., the DCI with CRC bits scrambled by the MSGB-RNTI). That is, both UE #1 and UE #2 receive the TB and perform corresponding HARQ decoding. However, in a case where the TB only contains the RAR of UE #1 but does not contain the RAR of UE #2, the HARQ feedback of the received TB may only need to be performed by the UE #1. Determination of the HARQ feedback may need involvement of the MAC entity.

Referring back to FIG. 2B, in action 216B, the UE performs MSGB PDSCH reception. Once the MSGA is transmitted, the UE may start a MSGB window (e.g., msgB-Response Window). In one implementation, the MSGB window may be started from the beginning of the first symbol of the upcoming PDCCH after the MSGA transmission. In another implementation, the MSGB window may be started from the beginning of the first symbol of the upcoming PDCCH after the MSGA transmission plus a timing offset. The timing offset may be predefined in the technical specification and/or preconfigured by the gNB on a per BWP/serving cell basis, but is not limited thereto.

Figure 4A:
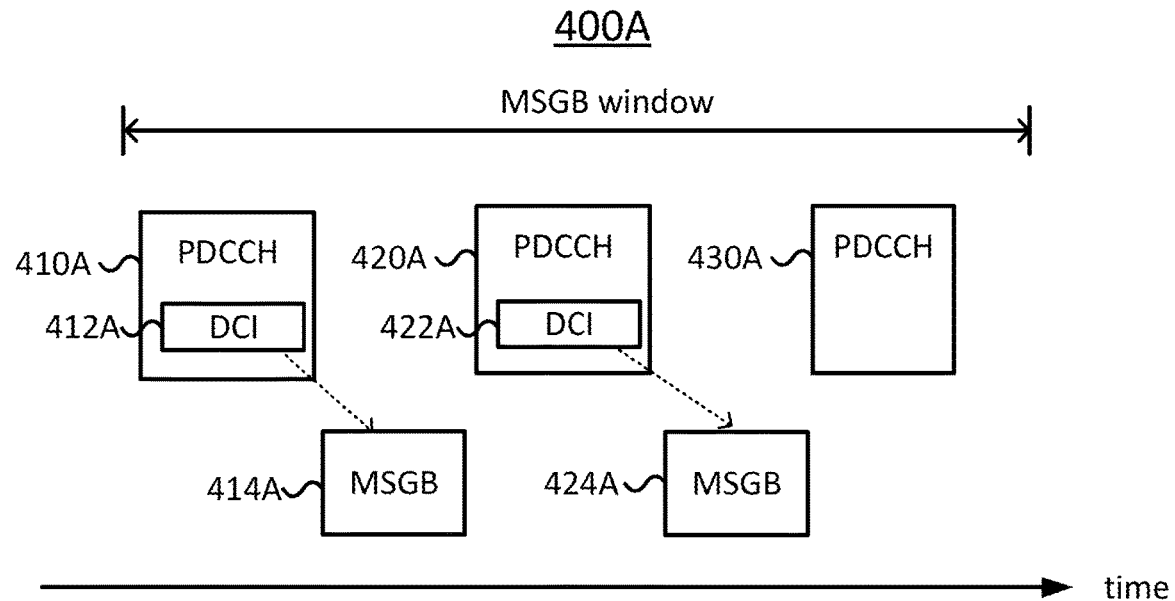
FIG. 4A illustrates a process of MSGB reception when payload of MSGA includes a CCCH SDU according to an example implementation of the present disclosure.

FIG. 4A illustrates a process 400A of MSGB reception when payload of MSGA includes a CCCH SDU according to an example implementation of the present disclosure. The UE may monitor PDCCHs (including PDCCH 410A, PDCCH 420A, PDCCH 430A) for an RAR identified by the MSGB-RNTI within the MSGB window. For example, DCI 412A with CRC bits scrambled by a first MSGB-RNTI schedules a MSGB 414A on a first PDSCH. DCI 422A with CRC bits scrambled by a second MSGB-RNTI schedules a MSGB 424A on a second PDSCH. If the first MSGB-RNTI is associated with the PRACH occasion in which the RA preamble is transmitted by the UE, the UE may successfully decode the DCI 412A and then receive the MSGB 414A. If the second MSGB-RNTI is associated with the PRACH occasion in which the RA preamble is transmitted by the UE, the UE may successfully decode the DCI 422A and then receive the MSGB 424A.

Figure 4B:
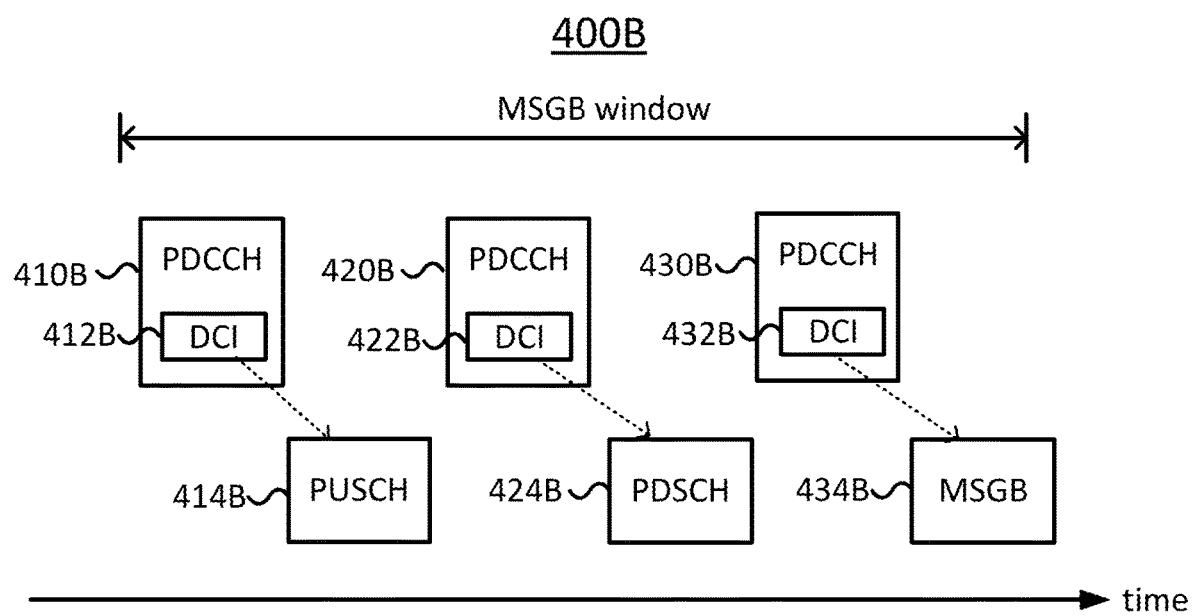
FIG. 4B illustrates a process of MSGB reception when payload of MSGA includes a C-RNTI MAC CE according to an example implementation of the present disclosure.

FIG. 4B illustrates a process 400B of MSGB reception when payload of MSGA includes a C-RNTI MAC CE according to an example implementation of the present disclosure. In this implementation the MSGA transmission has a payload on PUSCH including a C-RNTI MAC CE, the UE may additionally monitor PDCCH for an RAR identified by the C-RNTI within the MSGB window. That is, the UE may monitor PDCCHs (including PDCCH 410B, PDCCH 420B, PDCCH 430B) for an RAR identified by the MSGB-RNTI and monitor the PDCCHs for an RAR identified by the C-RNTI within the MSGB window. For example, DCI 412B with CRC bits scrambled by a first C-RNTI includes a UL grant that schedules a PUSCH 414B. DCI 422B with CRC bits scrambled by a second C-RNTI includes a DL assignment that schedules a PDSCH 424B. The second C-RNTI may be the same as the first C-RNTI if both the DCI 412B and the DCI 422B schedule data transmission for the same UE. The second C-RNTI may be different from the first C-RNTI if the DCI 412B and the DCI 422B schedule data transmission for different UEs. If the first C-RNTI is the same as the C-RNTI used by the UE for PDCCH monitoring, the UE may successfully decode the DCI 412B and then perform UL transmission on the PUSCH 414B. If the second C-RNTI is the same as the C-RNTI used by the UE for PDCCH monitoring, the UE may successfully decode the DCI 422B and then receive the PDSCH 424B, which may include an RAR. In one implementation, the PDSCH 424B may include an absolute timing advance command (TAC) MAC CE (e.g., 12 bits). DCI 432B with CRC bits scrambled by a MSGB-RNTI schedules a MSGB 434B on a PDSCH. If the MSGB-RNTI is associated with the PRACH occasion in which the RA preamble is transmitted by the UE, the UE may successfully decode the DCI 432B and then receive the MSGB 434B, which may include an RAR. In one implementation, the MSGB 434B may include multiple types of MAC subPDU, including a MAC subPDU including success RAR, a MAC subPDU including MAC SDU, a MAC subPDU including fallback RAR, a MAC subPDU including data for CCCH (data of signal radio bearer) and a subPDU including padding (i.e., a padding subPDU).

In one implementation the UE is in an RRC_CONNECTED state. The BS can schedule data transmission, such as PUSCH 414B and PDSCH 424B, based on the C-RNTI MAC CE received in the MSGA transmission. Because the C-RNTI is UE specific, communication using the C-RNTI can avoid collision with other UEs that may occur in communication using the MSGB-RNTI.

Referring back to FIG. 2B, in action 218B, the UE performs contention resolution. Once a MSGB is received, the UE performs contention resolution according to one or more MAC subPDU contained in the MAC PDU of the MSGB. In a case where the MSGA transmission with payload on PUSCH includes a C-RNTI MAC CE, the MSGB may either be indicated by a downlink assignment received on the PDCCH identified by the MSGB-RNTI or C-RNTI. In a case where the MSGA transmission with payload on PUSCH includes MAC SDU from CCCH, the MSGB may only be indicated by a downlink assignment received on the PDCCH identified by the MSGB-RNTI.

For a UE that includes the C-RNTI MAC CE in the MSGA transmission, the condition of contention resolution may be different depending on whether the UE has a valid timing advance value or not (time alignment timer is running or not). For example, the condition of contention resolution for a UE that has a valid timing advance value may be that a PDCCH is received and the PDCCH is addressed to the C-RNTI and contains a UL grant for a new transmission. The condition of contention resolution for a UE that does not has a valid timing advance value may be that a PDCCH is received and the PDCCH is addressed to the C-RNTI and contains a newly defined timing advance MAC CE.

Figure 5:
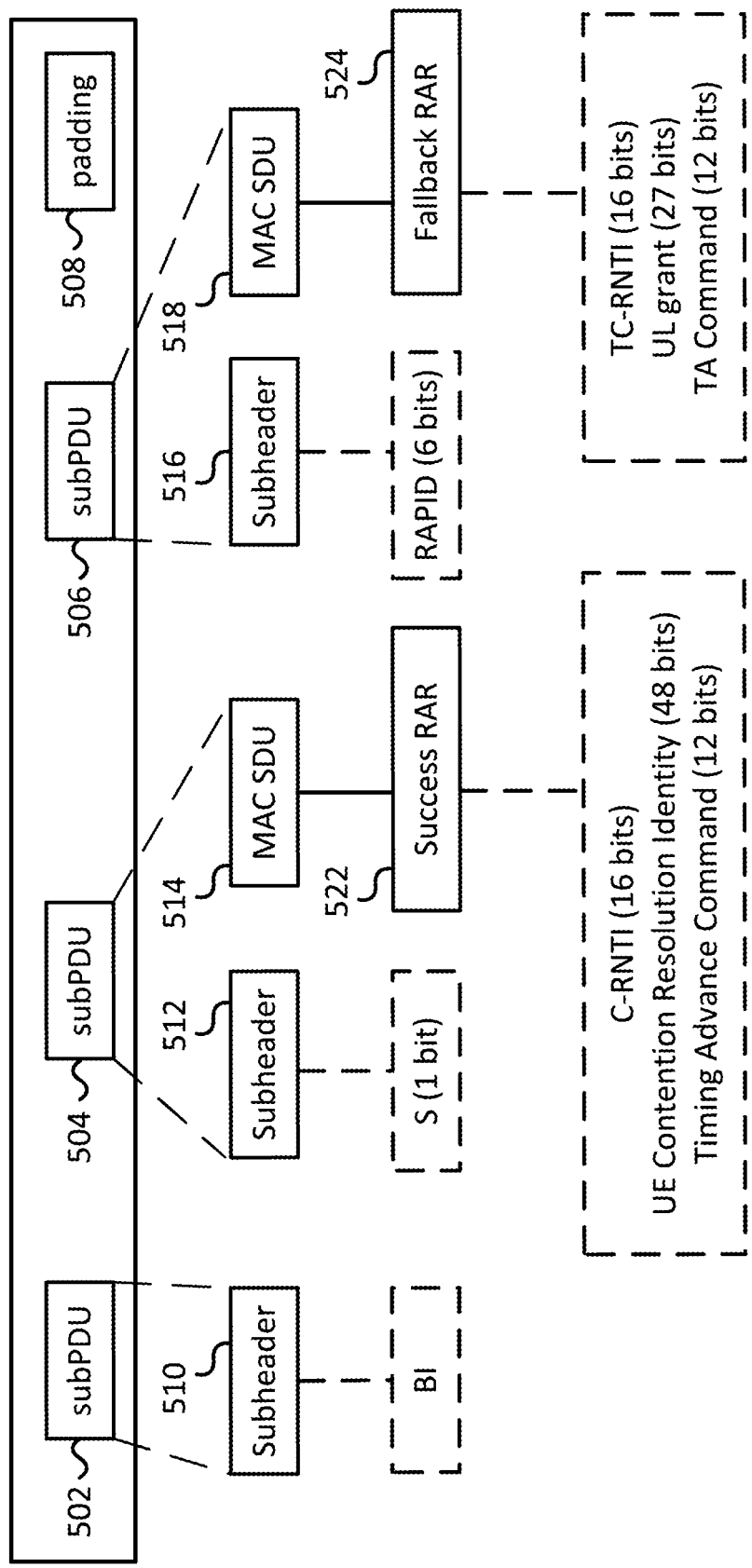
FIG. 5 illustrates multiple types of MAC subPDU that may be present in a MSGB according to an example implementation of the present disclosure.

A MAC PDU of the MSGB may include multiple types of MAC subPDU, including a MAC subPDU including success RAR, a MAC subPDU including MAC SDU, a MAC subPDU including fallback RAR, a MAC subPDU including data for CCCH (data of signal radio bearer) and a subPDU including padding (i.e., a padding subPDU). Different types of MAC subPDU may be identified by different subheaders. FIG. 5 illustrates multiple types of MAC subPDU that may be present in a MSGB 500 according to an example implementation of the present disclosure. A MAC subPDU 502 includes a subheader 510 including backoff indicator (BI). A MAC subPDU 504 includes a subheader 512 and a MAC SDU 514 corresponding to a success RAR 522. A MAC subPDU 506 includes a subheader 516 and a MAC SDU 518 corresponding to a fallback RAR 524.

In one implementation, the subPDU 504 including the success RAR 522 may be identified by a success RAR specific indicator or a specific field in the subheader 512. The specific field may implicitly indicate the corresponding MAC SDU via a predefined mapping rule. In one implementation, the specific field set to "0" means that the corresponding MAC SDU is a success RAR, and the specific field set to "1" means that the corresponding MAC SDU is a fallback RAR.

In one implementation, the MAC SDU 514 corresponding to the success RAR 522 may include C-RNTI (e.g., 16 bits), UE contention resolution identity (e.g., 48 bits), and/or timing advance command or information (e.g., 12 bits). If a CCCH SDU is included in the MSGA and the UE contention resolution identity in the MAC SDU 514 matches the CCCH SDU, the MAC entity of the UE may set the C-RNTI to the value received in the success RAR 522 and then consider the RAR reception successful. The UE then proceeds to perform action 220 completion of the RA procedure. In one implementation, the UE may stop the MSGB window.

In one implementation, the subheader 512 of the subPDU 504 corresponding to the success RAR 522 may include a specific field S (e.g., 1 bit). The gNB may indicate to the UE (which tends to receive the success RAR for contention resolution) via the specific field S whether the MSGB also includes other subPDU that the UE needs to receive/decode. For example, the specific field S may indicate that there is another subPDU to be received following the subPDU with the success RAR. In one implementation, the specific field S may be included in the MAC SDU 514 of the subPDU 504 corresponding to the success RAR 522.

In one implementation, the MAC subPDU 506 including the fallback RAR 524 may be identified by a specific field in the subheader 516. The specific field may implicitly indicate the corresponding MAC SDU via a predefined mapping rule. In one implementation, the specific field set to "0" means that the corresponding MAC SDU is a success RAR, and the specific field set to "1" means that the corresponding MAC SDU is a fallback RAR.

In one implementation, the subheader 516 may also include a Random Access Preamble Identity (RAPID) field (e.g., 6 bits), which indicates that the corresponding MAC SDU 518 is associated with a preamble transmission identified by the RAPID. In one implementation, the MAC SDU 518 may include Temporary C-RNTI (TC-RNTI as defined in 3GPP TS 38.321) (e.g., 16 bits), a UL grant (e.g., 27 bits) and a timing advance command (e.g., 12 bits). If the RAPID in the MAC subPDU 506 matches the transmitted preamble, the MAC entity of the UE considers the RAR reception successful. In one implementation, the UE may stop the MSGB window. The UE then proceeds to perform action 216C illustrated in FIG. 2C (arrow 256 illustrated in FIG. 2B, fallback from a 2-step RA to a 4-step RA). In action 216C, the UE performs MSG 3 transmission based on the TC-RNTI and the UL grant indicated by the fallback RAR 524.

In one implementation, the UE may receive no RAR that matches the transmitted MSGA or there may be no RAR that achieves successful contention resolution. If the UE does not receive success RAR/fallback RAR that matches (is addressed to) the MSGA transmission within the MSGB window, the UE may perform random backoff (arrow 252 illustrated in FIG. 2B, contention resolution failure) according to the BI received in the MAC subPDU 502 or a default BI and then go back to action 210B.

In one implementation, the gNB may configure the UE with a parameter indicating the maximum number of MSGA transmissions (e.g., msgATransMax). If the number of preamble transmission reaches the msgATransMax and the UE still fails the contention resolution in action 218B, the UE may proceed to perform action 210C illustrated in FIG. 2C (arrow 254 illustrated in FIG. 2B, fallback from the 2-step RA to the 4-step RA after multiple times of MSGA transmissions). In one implementation, the UE may release the BI value received from the MSGB upon fallback from action 218B to action 210C. In one implementation, the UE may set the backoff window size to zero upon fallback from action 218B to action 210C.

In action 220, the MAC entity of the UE considers the RA procedure successfully completed.

Actions 208C, 210C, 212C, 214C, 216C and 218C illustrated in FIG. 2C are similar to the 4-step RA procedure defined in 3GPP specifications (e.g., 3GPP TS 38.321). In action 214C, if the UE does not successfully receive the RAR, the UE may go back to action 210C for RA resource selection (arrow 262 illustrated in FIG. 2C, no RAR). If the UE chooses to perform the 4-step RA in action 206 illustrated in FIG. 2A and fails in contention resolution in action 218C, the UE may go back to action 210C for RA resource selection (arrow 264 illustrated in FIG. 2C, the 4-step RA and contention resolution failure). If the UE chooses to perform the 2-step RA in action 206 illustrated in FIG. 2A, receives a fallback RAR, performs MSG 3 transmission in action 216C scheduled by the MSGB of the 2-step RA received in action 216B, and fails in contention resolution in action 218C, the UE may proceed to perform action 210B for RA resource selection (arrow 266 illustrated in FIG. 2C, fallback from the 2-step RA and contention resolution failure).

Actions illustrated in FIG. 2A, FIG. 2B and FIG. 2C should not be construed as necessarily order dependent. The sequence of the actions may be changed or reordered in some implementations. Moreover, not all the actions may need to be completely executed. Some of the actions may be omitted in some implementations.

PDCCH Monitoring for MSGB Reception

As previously disclosed in the action 216B of FIG. 2B, within the MSGB window, which type of RNTI is applied by the UE for PDCCH monitoring for the MSGB reception may depend on the corresponding MSGA transmission. For example, depending on some consideration of the MSGA transmission, the UE attempts to detect DCI with CRC scrambled by a specific type of RNTI on PDCCH candidates within the MSGB window for possible MSGB reception. For example, in a case where the payload of the MSGA transmission on PUSCH includes a C-RNTI MAC CE as illustrated in FIG. 3B, the UE not only needs to monitor PDCCH for an RAR identified by MSGB-RNTI within the MSGB window but also needs to monitor PDCCH for an RAR identified by C-RNTI within the MSGB window.

In one implementation, the serving cell in which the UE performs RA may be deployed on the unlicensed spectrum. LBT procedures may need to be performed by a transmitter (e.g., UE and gNB) before each message transmission. The UE may perform LBT on PRACH for the preamble transmission and perform LBT on PUSCH for the payload transmission. Since the LBT on the PRACH and PUSCH may be performed independently, it is possible that the payload transmission is prohibited due to LBT failure on the PUSCH while the preamble transmission is performed due to LBT success. In this scenario, only the preamble of the MSGA may be received by the gNB, but the payload of the MSGA is not received by the gNB. Therefore, even if the payload of MSGA includes a C-RNTI MAC CE, the UE may not need to monitor PDCCH for an RAR identified by the C-RNTI within the MSGB window since the gNB cannot recognize the UE without the C-RNTI MAC CE reception. The gNB may only send a fallback RAR carried by a MSGB identified by a MSGB-RNTI in a case where the gNB only successfully receives the preamble of the MSGA.

Figure 6:
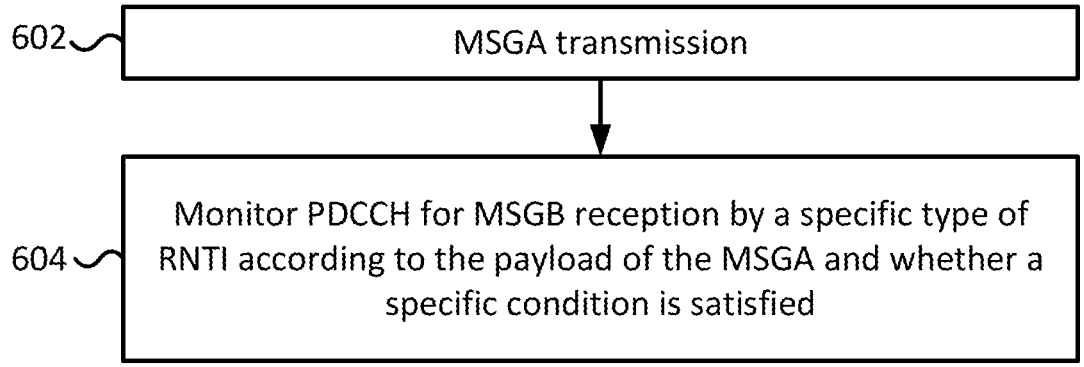
FIG. 6 illustrates a method of PDCCH monitoring for MSBG reception according to an example implementation of the present disclosure.

FIG. 6 illustrates a method 600 of PDCCH monitoring for MSBG reception according to an example implementation of the present disclosure. In action 602, the UE performs MSGA transmission. In one implementation, the UE may perform a first LBT procedure on a PRACH occasion for transmitting a preamble of the MSGA. The UE may perform a second LBT procedure on a PUSCH occasion for transmitting a payload of the MSGA. The payload of the MSGA may include a C-RNTI MAC CE. After the MSGA transmission, the UE may start a start a MSGB window (e.g., msgB-ResponseWindow) as disclosed in the action 216B illustrated in FIG. 2B. The UE may be either in an RRC connected state or in an RRC inactive state.

In action 604, after the end of the occasion of the MSGA transmission and within the MSGB window, the UE monitors PDCCH for MSGB reception by a specific type of RNTI (e.g., C-RNTI, MSGB-RNTI, MCS-C-RNTI and/or CS-RNTI) according to the payload of the MSGA and whether a specific condition is satisfied. It should be noted that which type of the RNTI is applied by the UE may depend on whether the specific condition is satisfied.

In one implementation, action 602 illustrated in FIG. 6 may be replaced by one or more actions listed below:

.after the PUSCH occasion/duration for the payload of the MSGA transmission;

.after the transmission occasion of the MSGA.

Table 1 includes example details of the implementations disclosed with respect to FIG. 6.

TABLE 1

After the PUSCH occasion/duration for payload of MSGA transmission regardless of the
possible occurrence of a measurement gap; or
After the transmission occasion of the MSGA regardless of the possible occurrence of a
measurement gap, the MAC entity shall:
    1> start the msgB-ResponseWindow at the first PDCCH occasion from the end of the
        MSGA transmission as specified in TS 38.213;
    1> monitor the PDCCH of the SpCell for a random access response identified by MSGB-
        RNTI while the msgB-ResponseWindow is running;
    1> if C-RNTI MAC CE was included in the MSGA;
        2> monitor the PDCCH of the SpCell for random access response identified by the C-
            RNTI while the msgB-ResponseWindow is running;
    1> if notification of a reception of a PDCCH transmission of the SpCell is received from
        lower layers:
        2> if the C-RNTI MAC CE was included in MSGA:
            3> if the Random Access procedure was initiated for beam failure recovery and the
                PDCCH transmission is addressed to the C-RNTI:
                4> consider this Random Access Response reception successful;
                4> consider this Random Access procedure successfully completed.
            3> else if the timeAlignmentTimer associated with the PTAG is running:
                4> if the PDCCH transmission is addressed to the C-RNTI and contains a UL
                    grant for a new transmission:
                    5> consider this Random Access Response reception successful;
                    5> consider this Random Access procedure successfully completed.
            3> else:
                4> if a downlink assignment has been received on the PDCCH for the C-RNTI
                    and the received TB is successfully decoded:
                    5> if the MAC PDU contains the Absolute Timing Advance Command MAC
                        CE:
                        6> consider this Random Access Response reception successful;
                        6> consider this Random Access procedure successfully completed.

The specific condition in action 604 illustrated in FIG. 6 may include one or more conditions listed below:
- if LBT failure indication is not received from a lower layer (e.g., physical layer) for the payload of MSGA transmission;
- if LBT success indication has been received from a lower layer (e.g., physical layer) for the payload of MSGA transmission;
- if the LBT of the PUSCH for payload of MSGA transmission is successful;
- if the C-RNTI MAC CE is included in (the MAC PDU of) the payload of MSGA.

Table 2 includes example details of the implementations disclosed with respect to FIG. 6, including the previously disclosed specific condition(s).

TABLE 2

After the PUSCH occasion/duration for payload of MSGA transmission regardless of the
possible occurrence of a measurement gap; or
After the transmission occasion of the MSGA regardless of the possible occurrence of a
measurement gap, the MAC entity shall:
    1> start the msgB-ResponseWindow at the first PDCCH occasion from the end of the
        MSGA transmission as specified in TS 38.213;
    1> monitor the PDCCH of the SpCell for a random access response identified by
        MSGB-RNTI while the msgB-ResponseWindow is running;
    1> if C-RNTI MAC CE was included in the MSGA;
        2> if LBT failure indication was not received from lower layers for the payload of
            MSGA transmission;
        2> if LBT success indication has been received from lower layers for the payload of
            MSGA transmission; or
        2> If the LBT of the PUSCH for payload of MSGA transmission is successful:
            3> monitor the PDCCH of the SpCell for random access response identified by
                the C-RNTI while the msgB-ResponseWindow is running;
    1> if notification of a reception of a PDCCH transmission of the SpCell is received from
        lower layers:
        2> if the C-RNTI MAC CE was included in MSGA:
            3> if LBT failure indication was not received from lower layers for the payload of
                MSGA transmission;
            3> if LBT success indication has been received from lower layers for the payload
                of MSGA transmission; or
            3> If the LBT of the PUSCH for payload of MSGA transmission is successful:
                4> if the Random Access procedure was initiated for beam failure recovery and
                    the PDCCH transmission is addressed to the C-RNTI:
                    5> consider this Random Access Response reception successful;
                    5> consider this Random Access procedure successfully completed.
                4> else if the timeAlignmentTimer associated with the PTAG is running:
                    5> if the PDCCH transmission is addressed to the C-RNTI and contains a
                      UL grant for a new transmission:
                        6> consider this Random Access Response reception successful;
                        6> consider this Random Access procedure successfully completed.

TABLE 2-continued

```
4> else:
    5> if a downlink assignment has been received on the PDCCH for the C-
        RNTI and the received TB is successfully decoded:
        6> if the MAC PDU contains the Absolute Timing Advance Command
            MAC CE:
            7> consider this Random Access Response reception successful;
            7> consider this Random Access procedure successfully completed.
```

Action 604 illustrated in FIG. 6 may additionally include one or more implementations listed below:

- the specific type of RNTI may be restricted to be utilized in a specific type of search space (e.g., common search space (CSS), UE specific search space (USS));
- the specific type of RNTI may be restricted to be utilized in a specific search space (set(s)) configured by a preconfigured search space configuration, such as the search space for random access procedure (e.g., ra-SearchSpace) as defined in 3GPP TS 38.331;
- the specific type of RNTI may be restricted to be utilized for monitoring PDCCH candidates for a specific type of DCI format (e.g., DCI format 0_0 and DCI format 1_0) with CRC scrambled by the specific type of RNTI;
- the specific type of RNTI may be restricted to be utilized for a specific Control Resource Set (CORESET as defined in 3GPP TS 38.331) configuration;
- the specific type of RNTI may be restricted to be utilized on PDCCH of a specific serving cell (e.g., PCell, PSCell);
- the specific type of RNTI may be restricted to be utilized on PDCCH of a specific BWP.

In one implementation, in action 604, the MAC entity of the UE may indicate to a lower layer (e.g., PHY layer) whether the PUSCH transmission (of the MSGA) contains the C-RNTI MAC CE.

Table 3 includes example details, from a lower layer's perspective (e.g., PHY layer), of the implementations disclosed with respect to FIG. 6.

TABLE 3

In response to a transmission of a PRACH and a PUSCH, a UE attempts to detect a DCI format 1_0 with CRC scrambled by a corresponding MSGB-RNTI during a window controlled by higher layers [TS 38.321]. The UE should also attempt to detect a DCI format 0_0 and 1_0 with CRC scrambled by a corresponding C-RNTI during the window if the LBT of the PUSCH is successful and/or if an indication of the PUSCH transmission (of the MSGA) includes C-RNTI MAC CE has been received from upper layer(s). The window starts at the first symbol of the earliest CORESET the UE is configured to receive PDCCH for Type1-PDCCH CSS set, that is at least one symbol, after the last symbol of the PUSCH occasion corresponding to the PUSCH transmission, where the symbol duration corresponds to the SCS for Type1-PDCCH CSS set. The length of the window in number of slots, based on the SCS for Type1-PDCCH CSS set, is provided by msgB-ResponseWindow.
If the UE detects the DCI format 1_0 with CRC scrambled by the corresponding MSGB-RNTI and a transport block in a corresponding PDSCH within the window, the UE passes the transport block to higher layers. The higher layers indicate to the physical layer
- an uplink grant if the RAR message(s) is for fallbackRAR and a random access preamble identity (RAPID) associated with the PRACH transmission is identified, and the UE procedure continues when the UE detects a RAR UL grant, or
- transmission of an ACK if the RAR message(s) is for successRAR
If the UE detects the DCI format 1_0 with CRC scrambled by a C-RNTI and a transport block in a corresponding PDSCH within the window, the UE transmits an ACK if the UE correctly detects the transport block or a NACK if the UE incorrectly detects the transport block and the time alignment timer is running [TS 38.321]. The UE does not expect to be indicated to transmit a PUCCH with the HARQ-ACK information at a time that is prior to a time when the UE applies a TA command that is provided by the transport block.

Table 4 includes example details, from a lower layer's perspective (e.g., PHY layer), of the implementations disclosed with respect to FIG. 6.

TABLE 4

If a UE is provided
- one or more search space sets by corresponding one or more of searchSpaceZero, searchSpaceSIB1, searchSpaceOtherSystemInformation, pagingSearchSpace, ra-SearchSpace, MSGB-specific-SearchSpace and
- a C-RNTI, an MCS-C-RNTI, or a CS-RNTI,
the UE monitors PDCCH candidates for DCI format 0_0 and DCI format 1_0 with CRC scrambled by the C-RNTI, the MCS-C-RNTI, or the CS-RNTI in the one or more search space sets in a slot where the UE monitors PDCCH candidates for at least a DCI format 0_0 or a DCI format 1_0 with CRC scrambled by SI-RNTI, RA-RNTI, MSGB-RNTI or P-RNTI.

Table 5 includes example details, from a lower layer's perspective (e.g., PHY layer), of the implementations disclosed with respect to FIG. 6.

TABLE 5

If a UE is provided
- one or more search space sets by corresponding one or more of searchSpaceZero, searchSpaceSIB1, searchSpaceOtherSystemInformation, pagingSearchSpace, ra-SearchSpace, MSGB-specific-SearchSpace and
- a C-RNTI, an MCS-C-RNTI, or a CS-RNTI;
And if the LBT of the PUSCH of MSGA is successful and/or an indication of the PUSCH transmission of MSGA includes C-RNTI MAC CE has been received from upper layer(s):
-the UE monitors PDCCH candidates for DCI format 0_0 and DCI format 1_0 with CRC scrambled by the C-RNTI, the MCS-C-RNTI, or the CS-RNTI in the one or more search space sets in a slot where the UE monitors PDCCH candidates for at least a DCI format 0_0 or a DCI format 1_0 with CRC scrambled by MSGB-RNTI;

Table 6 includes example details, from a MAC entity's perspective of the implementations disclosed with respect to FIG. 6.

TABLE 6

The MAC entity shall, for each MSGA:
   1> if PREAMBLE_TRANSMISSION_COUNTER is greater than one; and
   1> if the notification of suspending power ramping counter has not been received from lower layers; and
   1> if SSB selected is not changed from the selection in the last Random Access Preamble transmission:
      2> increment PREAMBLE_POWER_RAMPING_COUNTER by 1.
   1> select the value of DELTA_PREAMBLE according to subclause 7.3 of TS 38.321;
   1> set PREAMBLE_RECEIVED_TARGET_POWER to preambleReceivedTargetPower + DELTA_PREAMBLE + (PREAMBLE_POWER_RAMPING_COUNTER – 1) × PREAMBLE_POWER_RAMPING_STEP;
   1> if this is the first MSGA transmission within this Random Access procedure:
      2> if the transmission is not being made for the CCCH logical channel:
         3> indicate to the Multiplexing and assembly entity to include a C-RNTI MAC CE in the subsequent uplink transmission; and
         3> instruct the lower layer (physical layer) the MSGA transmission includes the C-RNTI MAC CE;
      2> obtain the MAC PDU to transmit from the Multiplexing and assembly entity and store it in the MSGA buffer.
   1> compute the MSGB-RNTI associated with the PRACH occasion in which the Random Access Preamble is transmitted;
   1> instruct the physical layer to transmit the MSGA using the selected PRACH occasion and the associated PUSCH resource, using the corresponding RA-RNTI, MSGB-RNTI, PREAMBLE_INDEX, PREAMBLE_RECEIVED_TARGET_POWER.

Figure 7:
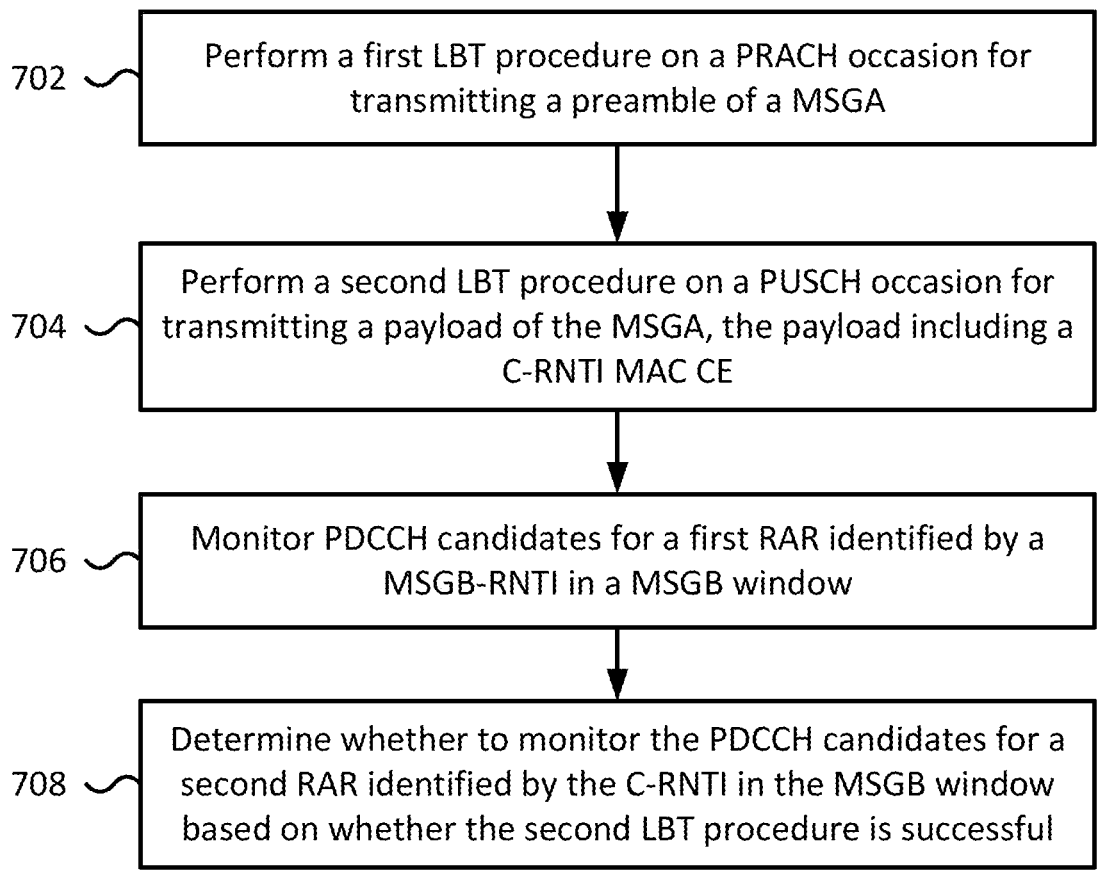
FIG. 7 illustrates a method performed by a UE for a 2-step RA procedure according to an example implementation of the present disclosure.

FIG. 7 illustrates a method 700 performed by a UE for a 2-step RA procedure according to an example implementation of the present disclosure. In action 702, the UE performs a first LBT procedure on a PRACH occasion for transmitting a preamble of a MSGA. In action 704, the UE performs a second LBT procedure on a PUSCH occasion for transmitting a payload of the MSGA, the payload including a C-RNTI MAC CE. In action 706, the UE monitors PDCCH candidates for a first RAR identified by a MSGB-RNTI in a MSGB window. In action 708, the UE determines whether to monitor the PDCCH candidates for a second RAR identified by the C-RNTI in the MSGB window based on whether the second LBT procedure is successful. The first LBT procedure on the PRACH and the second LBT procedure on the PUSCH may be performed independently. That is, the success/failure of the first LBT procedure may be independent of the success/failure of the second LBT procedure. Therefore, it is possible that the preamble of the MSGA is transmitted successfully but the payload of the MSGA including the C-RNTI MAC CE is not transmitted successfully.

In one implementation, in action 708, the UE determines to monitor the PDCCH candidates for the second RAR identified by the C-RNTI in the MSGB window after determining that the second LBT procedure is successful. In one implementation, in action 708, the UE determines not to monitor the PDCCH candidates for the second RAR identified by the C-RNTI in the MSGB window after determining that the second LBT procedure is unsuccessful.

In one implementation, the UE may determine whether an LBT procedure, including the first LBT procedure and the second LBT procedure, is successful based on whether a MAC entity of the UE receives an LBT failure indication from a lower layer (e.g., PHY layer). In one implementation, the UE may determine whether an LBT procedure, including the first LBT procedure and the second LBT procedure, is successful based on whether a MAC entity of the UE receives an LBT success indication from a lower layer (e.g., PHY layer).

In one implementation, the UE is in an RRC connected state when performing the 2-step RA procedure illustrated in FIG. 7. Therefore, the UE may have a UE specific C-RNTI and the payload of the MSGA may include the C-RNTI MAC CE accordingly.

In one implementation, the UE may monitor the PDCCH candidates for a DCI format with CRC bits scrambled by the C-RNTI after determining that the second LBT procedure is successful, where the DCI format is one of a DCI format 0_0 and a DCI format 1_0.

In one implementation, the UE may compute the MSGB-RNTI associated with the PRACH occasion. A transport block (TB) for the PUSCH occasion for transmitting the payload may be with CRC bits scrambled by the MSGB-RNTI.

According to the previously disclosed implementations, the UE may monitor PDCCH candidates identified by the C-RNTI upon determining that the second LBT procedure is successful. The UE does not need to monitor PDCCH candidates identified by the C-RNTI upon determining that the second LBT procedure is unsuccessful. Therefore, the UE can reduce unnecessary blind decoding effort and power consumption related to the C-RNTI when the payload of the MSGA is not transmitted successfully due to LBT failure.

All implementations in the present disclosure are not limited to application to address the problem identified in the present disclosure. For example, the disclosed implementations may be applied to solve any problem existing in a RAN of a cellular wireless communication system.

All the numbers in the implementations in the present disclosure are just exemplary rather than limiting. The numbers are provided as an example to better illustrate how the method is executed.

The DL RRC message in the present disclosure may be RRCReconfiguration, RRCResume, RRCReestablishment, RRCSetup or any other DL unicast RRC message.

The expression "a specific configuration is configured per UE" or "a specific configuration is provided to a UE" in the present disclosure may mean that the specific configuration may be provided via a DL RRC message.

The expression "a specific configuration is configured per cell group" or "a specific configuration is provided to a cell group" in the present disclosure may mean that the specific configuration may be provided via a CellGroupConfig, MAC-CellGroupConfig or PhysicalCellGroupConfig IE.

The expression "a specific configuration is configured per serving cell" or "a specific configuration is provided to a serving cell" in the present disclosure may mean that the specific configuration may be provided via a ServingCellConfigCommon, ServingCellConfig, PUSCH-ServingCellConfig or PDSCH-ServingCellConfig IE.

The expression "a specific configuration is configured per UL BWP or per BWP" or "a specific configuration is provided via a UL BWP or for a BWP" in the present disclosure may mean that the specific configuration may be provided via a BWP-Uplink, BWP-UplinkDedicated, BWP-UplinkCommon, PUSCH-ConfigCommon or PUSCH-Config IE.

The expression "a specific configuration is configured per DL BWP or per BWP" or "a specific configuration is provided via a DL BWP or a BWP" in the present disclosure may mean that the specific configuration may be provided via a BWP-Downlink, BWP-DownlinkDedicated, BWP-DownlinkCommon, PDSCH-ConfigCommon or PDSCH-Config IE.

The term "beam" in the present disclosure is equivalent to a spatial (domain) filtering. In one example, the spatial filtering is applied in analog domain by adjusting phase and/or amplitude of the signal before transmitted by a corresponding antenna element. In another example, the spatial filtering is applied in digital domain by Multi-input Multi-output (MIMO) technique in wireless communication system. For example, a UE made a PUSCH transmission by using a specific beam means the UE made the PUSCH transmission by using the specific spatial/digital domain filter. The "beam" may also be represented as an antenna, an antenna port, an antenna element, a group of antennas, a group of antenna ports, or a group of antenna elements, but not limited thereto. The beam may also be formed by a certain reference signal resource. In brief, the beam may be equivalent to a spatial domain filter which radiated the EM wave through.

The term "transmitted" used in the previously disclosed implementations may mean that transmission of a corresponding MAC CE/MAC PDU/layer 1 signaling/higher layer signaling is started, is completely transmitted, or is already delivered to a corresponding HARQ process/buffer for transmission. The term "transmitted" used in the previously disclosed implementations may also mean that the HARQ_ACK feedback (response from gNB) of the MAC PDU carrying the MAC CE/MAC PDU/layer 1 signaling/higher layer signaling is received. The term "transmitted" used in the previously disclosed implementations may also mean that a corresponding MAC CE/MAC PDU is built.

The "HARQ_ACK feedback" may be implemented as a DCI format 0_0, DCI format 0_1 or some other DCI formats received by the UE from the gNB on PDCCH. The received DCI includes an NDI set to a specific value (e.g., set to 1) and the DCI also indicates a HARQ process ID that is the same as a HARQ process ID applied by/indicated to be used for the HARQ process of the MAC PDU transmission.

The PDCCH in the present disclosure is transmitted by the gNB to the UE. The PDCCH is received by the UE from the gNB. The PDSCH in the present disclosure is transmitted by the gNB to the UE. The PDSCH is received by the UE from the gNB. The PUSCH in the present disclosure is transmitted by the UE to the gNB. The PUSCH is received by the gNB from the UE.

A PDCCH/PDSCH/PUSCH transmission may span multiple symbols in the time domain. A time duration of a PDSCH/PDSCH/PUSCH (transmission) may represent a time interval that starts from the beginning of the first symbol of the PDSCH/PDSCH/PUSCH (transmission) and ends at the end of the last symbol of the PDSCH/PDSCH/PUSCH (transmission).

The term "A and/or B" in the present disclosure means "A", "B" or "A and B". The term "A and/or B and/or C" within the present disclosure means "A", "B", "C", "A and B", "A and C", "B and C" or "A and B and C".

The term "A/B" in the present disclosure means "A" or "B".

In the present disclosure, the term "by specific Physical layer signaling" may include at least one of, but not limited to, by a specific format of DCI; by a specific field of DCI; by a specific field of DCI, and the field is set to a specific value or by DCI with CRC bits scrambled with a specific RNTI.

In the present disclosure, "a MAC timer" may be configured by RRC that is indicated by the gNB. The UE may be configured with an initial value of the timer. The unit of the initial value may be frame/sub-frame/millisecond/sub-millisecond/slot/symbol. The timer may be started and/or restarted by the UE (e.g., the MAC entity of the UE). The timer may be started and/or restarted by the UE (e.g., the MAC entity of the UE) when a specific condition is satisfied.

Figure 8:
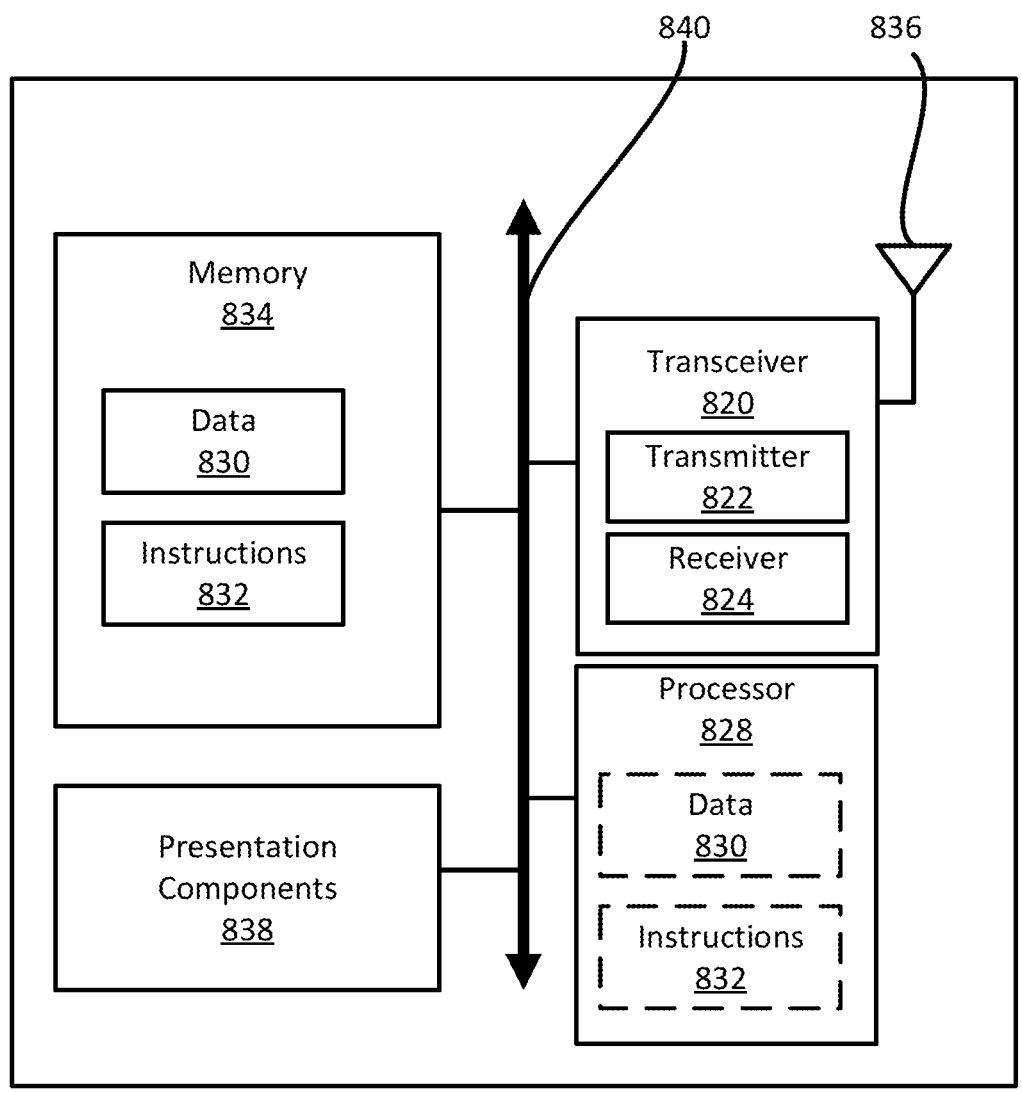
FIG. 8 is a block diagram illustrating a node for wireless communication according to an example implementation of the present disclosure.

FIG. 8 is a block diagram illustrating a node 800 for wireless communication according to an example implementation of the present disclosure. As illustrated in FIG. 8, the node 800 may include a transceiver 820, a processor 828, a memory 834, one or more presentation components 838, and at least one antenna 836. The node 800 may also include a radio frequency (RF) spectrum band module, a BS communications module, a network communications module, and a system communications management module, Input/Output (I/O) ports, I/O components, and a power supply (not illustrated in FIG. 8).

Each of the components may directly or indirectly communicate with each other over one or more buses 840. The node 800 may be a UE or a BS that performs various functions disclosed with reference to FIGS. 1A through 7.

The transceiver 820 has a transmitter 822 (e.g., transmitting/transmission circuitry) and a receiver 824 (e.g., receiving/reception circuitry) and may be configured to transmit and/or receive time and/or frequency resource partitioning information. The transceiver 820 may be configured to transmit in different types of subframes and slots including but not limited to usable, non-usable and flexibly usable subframes and slot formats. The transceiver 820 may be configured to receive data and control channels.

The node 800 may include a variety of computer-readable media. Computer-readable media may be any available media that may be accessed by the node 800 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 834 may include computer-storage media in the form of volatile and/or non-volatile memory. The memory 834 may be removable, non-removable, or a combination thereof. Example memory may include solid-state memory, hard drives, optical-disc drives, etc. As illustrated in FIG. 8, the memory 834 may store computer-readable, computer-executable instructions 832 (e.g., software codes) that are configured to cause the processor 828 to perform various functions disclosed herein, for example, with reference to FIGS. 1A through 7. Alternatively, the instructions 832 may not be directly executable by the processor 828 but be configured to cause the node 800 (e.g., when compiled and executed) to perform various functions disclosed herein.

The processor 828 (e.g., having processing circuitry) may include an intelligent hardware device, e.g., a Central Processing Unit (CPU), a microcontroller, an ASIC, etc. The processor 828 may include memory. The processor 828 may process the data 830 and the instructions 832 received from the memory 834, and information transmitted and received via the transceiver 820, the base band communications module, and/or the network communications module. The processor 828 may also process information to be sent to the transceiver 820 for transmission via the antenna 836 to the network communications module for transmission to a core network.

One or more presentation components 838 may present data indications to a person or another device. Examples of presentation components 838 may include a display device, a speaker, a printing component, and a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) for a 2-step random access (RA) procedure, the UE comprising:
   at least one processor; and
   at least one memory coupled to the at least one processor and storing computer-executable instructions that, when executed by the at least one processor, cause the UE to:
   perform a first Listen-Before-Talk (LBT) procedure on a Physical Random Access Channel (PRACH) occasion for transmitting a preamble of a message A (MSGA);
   perform a second LBT procedure on a Physical Uplink Shared Channel (PUSCH) occasion for transmitting a payload of the MSGA, the payload including a Medium Access Control (MAC) Control Element (CE) including a Cell-Radio Network Temporary Identifier (C-RNTI);
   monitor Physical Downlink Control Channel (PDCCH) candidates for a first random access response (RAR) identified by a message B (MSGB)-Radio Network Temporary Identifier (RNTI) in a MSGB window; and
   monitor the PDCCH candidates for a second RAR identified by the C-RNTI in the MSGB window in a case that the second LBT procedure is successful.

2. The UE of claim 1, wherein the UE determines not to monitor the PDCCH candidates for the second RAR identified by the C-RNTI in the MSGB window after determining that the second LBT procedure is unsuccessful.

3. The UE of claim 1, wherein the computer-executable instructions, when executed by the at least one processor, further cause the UE to:
   determine whether the second LBT procedure is successful based on whether a MAC entity of the UE receives an LBT failure indication from a lower layer.

4. The UE of claim 1, wherein the UE is in a Radio Resource Control (RRC) Connected state.

5. The UE of claim 1, wherein the computer-executable instructions, when executed by the at least one processor, further cause the UE to:
   monitor the PDCCH candidates for a Downlink Control Information (DCI) format with Cyclic Redundancy Check (CRC) bits scrambled by the C-RNTI after determining that the second LBT procedure is successful, wherein the DCI format is one of a DCI format 0_0 and a DCI format 1_0.

6. The UE of claim 1, wherein the computer-executable instructions, when executed by the at least one processor, further cause the UE to:
  compute the MSGB-RNTI associated with the PRACH occasion,
  wherein a Transport Block (TB) for the PUSCH occasion for transmitting the payload includes Cyclic Redundancy Check (CRC) bits scrambled by the MSGB-RNTI.

7. A method performed by a user equipment (UE) for a 2-step random access (RA) procedure, the method comprising:
  performing a first Listen-Before-Talk (LBT) procedure on a Physical Random Access Channel (PRACH) occasion for transmitting a preamble of a message A (MSGA);
  performing a second LBT procedure on a Physical Uplink Shared Channel (PUSCH) occasion for transmitting a payload of the MSGA, the payload including a Medium Access Control (MAC) Control Element (CE) including a Cell-Radio Network Temporary Identifier (C-RNTI);
  monitoring Physical Downlink Control Channel (PDCCH) candidates for a first random access response (RAR) identified by a message B (MSGB)-Radio Network Temporary Identifier (RNTI) in a MSGB window; and
  monitoring the PDCCH candidates for a second RAR identified by the C-RNTI in the MSGB window in a case that the second LBT procedure is successful.

8. The method of claim 7, wherein the UE determines not to monitor the PDCCH candidates for the second RAR identified by the C-RNTI in the MSGB window after determining that the second LBT procedure is unsuccessful.

9. The method of claim 7, further comprising:
  determining whether the second LBT procedure is successful based on whether a MAC entity of the UE receives an LBT failure indication from a lower layer.

10. The method of claim 7, wherein the UE is in a Radio Resource Control (RRC) Connected state.

11. The method of claim 7, further comprising:
  monitoring the PDCCH candidates for a Downlink Control Information (DCI) format with Cyclic Redundancy Check (CRC) bits scrambled by the C-RNTI after determining that the second LBT procedure is successful, wherein the DCI format is one of a DCI format 0_0 and a DCI format 1_0.

12. The method of claim 7, further comprising:
  computing the MSGB-RNTI associated with the PRACH occasion,
  wherein a Transport Block (TB) for the PUSCH occasion for transmitting the payload includes Cyclic Redundancy Check (CRC) bits scrambled by the MSGB-RNTI.

* * * * *